US010812961B2

(12) United States Patent
Gage et al.

(10) Patent No.: US 10,812,961 B2
(45) Date of Patent: *Oct. 20, 2020

(54) METHOD AND SYSTEM FOR DISCOVERY OF DEVICES IN A WIRELESS NETWORK WITH PARTIAL COVERAGE

(71) Applicant: BlackBerry Limited, Waterloo (CA)

(72) Inventors: William Anthony Gage, Stittsville (CA); Biswaroop Mukherjee, Stittsville (CA); Masoud Ebrahimi Tazeh Mahalleh, Ottawa (CA); Robert Novak, Stittsville (CA); Zhijun Cai, Ashburn, VA (US)

(73) Assignee: BlackBerry Limited, Waterloo, Ontario (CA)

( * ) Notice: Subject to any disclaimer, the term of this patent is extended or adjusted under 35 U.S.C. 154(b) by 24 days.

This patent is subject to a terminal disclaimer.

(21) Appl. No.: 15/943,397

(22) Filed: Apr. 2, 2018

(65) Prior Publication Data

US 2018/0227740 A1   Aug. 9, 2018

Related U.S. Application Data

(63) Continuation of application No. 14/067,675, filed on Oct. 30, 2013, now Pat. No. 9,936,368.

(51) Int. Cl.
*H04W 8/00* (2009.01)
*H04W 84/18* (2009.01)
(Continued)

(52) U.S. Cl.
CPC ......... *H04W 8/005* (2013.01); *H04W 28/021* (2013.01); *H04W 52/0209* (2013.01);
(Continued)

(58) Field of Classification Search
CPC ..... H04W 76/14; H04W 76/11; H04W 8/005; H04W 92/18; H04W 4/70; H04W 88/04;
(Continued)

(56) References Cited

U.S. PATENT DOCUMENTS 5,794,146 A    8/1998   Sevcik et al.
9,271,302 B2   2/2016   Novak et al.
(Continued)

FOREIGN PATENT DOCUMENTS

AU    2013902574    *  7/2013
CN    102369767       3/2012
(Continued)

OTHER PUBLICATIONS

Extended Search Report issued in EP Application No. 17206316.6-1214 dated Feb. 9, 2018; 10 pages. (47450-EP-EPD).
(Continued)

*Primary Examiner* — Christopher M Crutchfield
(74) *Attorney, Agent, or Firm* — Fish & Richardson P.C.

(57) ABSTRACT

A method at a wireless device outside of base station control, the method comprising: transmitting a device presence signal for a predetermined time period; and listening for a network presence signal sent in response to the device presence signal. Further, a method at a wireless device, the method comprising: listening for a device presence signal; and transmitting a network presence signal in response to the device presence signal.

19 Claims, 11 Drawing Sheets

(51) Int. Cl.
*H04W 84/22* (2009.01)
*H04W 28/02* (2009.01)
*H04W 52/02* (2009.01)

(52) U.S. Cl.
CPC ....... *H04W 52/0241* (2013.01); *H04W 84/18* (2013.01); *H04W 84/22* (2013.01); *Y02D 70/10* (2018.01); *Y02D 70/12* (2018.01); *Y02D 70/122* (2018.01); *Y02D 70/126* (2018.01); *Y02D 70/1262* (2018.01); *Y02D 70/142* (2018.01); *Y02D 70/144* (2018.01); *Y02D 70/146* (2018.01); *Y02D 70/166* (2018.01); *Y02D 70/21* (2018.01); *Y02D 70/22* (2018.01); *Y02D 70/24* (2018.01); *Y02D 70/25* (2018.01)

(58) Field of Classification Search
CPC ............ H04W 72/042; H04W 72/0413; H04L 5/0048
See application file for complete search history.

(56) References Cited

U.S. PATENT DOCUMENTS

| | | | |
|---|---|---|---|
| 9,565,573 | B2 | 2/2017 | Mukherjee et al. |
| 9,936,368 | B2* | 4/2018 | Gage ............... H04W 8/005 |
| 2012/0011247 | A1* | 1/2012 | Mallik ............... H04W 8/005 709/224 |
| 2012/0321452 | A1 | 1/2012 | Mallik |
| 2013/0051277 | A1 | 2/2013 | Hakola |
| 2013/0067065 | A1 | 3/2013 | Navasivasakthivelsamy et al. |
| 2014/0112194 | A1 | 4/2014 | Novlan |
| 2014/0177536 | A1 | 6/2014 | Novak et al. |
| 2014/0254429 | A1 | 9/2014 | Wang |
| 2014/0295829 | A1* | 10/2014 | Turtinen ............... H04W 8/005 455/426.1 |
| 2014/0321452 | A1 | 10/2014 | Choi |
| 2014/0335853 | A1* | 11/2014 | Sartori ............. H04W 56/0015 455/426.1 |
| 2015/0264595 | A1* | 9/2015 | Morita .................. H04W 8/005 370/252 |
| 2016/0112858 | A1* | 4/2016 | Nguyen ................ H04W 8/005 370/329 |
| 2016/0192171 | A1* | 6/2016 | Takano ................ H04W 76/14 370/329 |

FOREIGN PATENT DOCUMENTS

| | | |
|---|---|---|
| CN | 102972051 | 3/2013 |
| CN | 105580456 | 5/2016 |
| WO | 2013049959 | 4/2013 |

OTHER PUBLICATIONS

Nokia, Nokia Siemens Networks; "D2D Discovery"; 3GPP TSG-RAN WG1 Meeting #73; R1-132317; Fukuoka, Japan, May 20-24, 2013; 5 pages.
HTC; "Construction of D2D Relay Communication in Public Safety Scenario"; 3GPP TSG RAN WG1 Meeting #74; R1-133262; Barcelona, Spain, Aug. 19-23, 2013; 5 pages.
HTC; "Physical Layer Considerations on D2D Discovery"; 3GPP TSG RAN WG1 Meeting #73; R1-132653; Fukuoka, Japan, May 20-24, 2013; 2 pages.
Communication Pursuant to Article 94(3) EPC issued in EP Application No. 14190969.7 dated Oct. 12, 2016; 7 pages (47450-EP-EPA).
Author Unknown, Device discovery for D2D Proximity Services, 3GPP TSG-RAN1, Doc. No. R1-130954, Apr. 19, 2013, pp. 1-4.
Extended European Search Report issued in EP Application No. 14190969.7 dated Mar. 13, 2015; 9 pages (47450-EP-EPA).
HTC, R1-133262; "Construction of D2D Relay Communication in Public Safety Scenario" 3GPP TSG RAN WG1 Meeting #74; Barcelona, Spain, Aug. 19-23, 2013; 5 pages.
HTC, R1-132082; "Device Discovery in D2D Communications" 3GPP TSG RAN WG1 Meeting #73; Fukuoka, Japan, May 20-24, 2013; 5 pages.
3GPP TR 22.803, "Feasibility Study for Proximity Services (ProSe)", v.12.2.0, Jun. 2013.
3GPP TS 36.211, "Evolved Universal Terrestrial Radio Access Network (E-UTRAN); Physical Channels and Modulation", v.11. 4.0, Sep. 2013.
3GPP TS 36.300, "Evolved Universal Terrestrial Radio Access Network (E-UTRAN); Overall description; Stage 2", v.11.7.0, Sep. 2013.
3GPP TS 36.321, "Evolved Universal Terrestrial Radio Access Network (E-UTRAN); Medium Access Control (MAC) protocol specification", v. 11.3.0, Jun. 2013.
3GPP TS 36.331, "Evolved Universal Terrestrial Radio Access Network (E-UTRAN); Radio Resource Control (RRC) protocol specification", v. 11.5.0, Sep. 2013.
IEEE 802.11 2012, "Wireless LAN Medium Access Control (MAC) and Physical Layer (PHY) Specifications", Mar. 2012.
U.S. Appl. No. 13/969,192, filed Aug. 16, 2013 (46758-US-PAT).
U.S. Appl. No. 13/723,926, filed Dec. 21, 2012 (43306-US-PAT).
U.S. Appl. No. 13/724,020, filed Dec. 21, 2012 (43306-US-PAT[2]).
International Application No. PCT/CA2013/050999 filed Dec. 20, 2013 (43306-WO-PCT).
Nokia, NSN: "D2D Synchronization—Out of Network Coverage/Partial Network Coverage" 3GPP TSG-RAN WG1 Meeting #74, Barcelona, Spain, Aug. 19-23, 2013; 4 pages.
Extended European Search Report issued in European Application No. 17206316.6 dated Feb. 16, 2018, 10 pages.
Nokia, "D2D Synchronization—Out of network coverage/partial network coverage", 3GPP TSG-RAN WG1 Meeting #74, R1-133496, Barcelona, Spain, Aug. 19-23, 2013, 4 pages.
Office Action issued in Chinese Application No. 201410599072.2 dated Feb. 22, 2019, 10 pages.
Office Action issued in Chinese Application No. 201410599072.2 dated Aug. 12, 2019, 3 pages.

\* cited by examiner

METHOD AND SYSTEM FOR DISCOVERY OF DEVICES IN A WIRELESS NETWORK WITH PARTIAL COVERAGE

CROSS REFERENCE TO RELATED APPLICATION

This patent is a continuation of and claims the benefit of U.S. Non-Provisional application Ser. No. 14/067,675, filed Oct. 30, 2013, the entire contents of which is hereby expressly incorporated by reference herein in its entirety.

FIELD OF THE DISCLOSURE

The present disclosure relates to wireless device-to-device (D2D) communication and in particular relates to discovery of devices.

BACKGROUND

In some wireless systems, signals from a set of base stations (BS) may not provide coverage everywhere within the geographical area covered by the base stations. As a result, two types of wireless devices may be operating within the service area.

A first type of wireless device is referred to herein as an In-coverage Device (ICD) and such devices are able to communicate directly with the BS using the uplink and downlink radio resources of a cell.

A second type of device is a Not-in-coverage Device (NICD) and such devices are not able to communicate directly with the base station either due to the distance between the NICD and the base station or due to obstacles between the NICD and the base station.

In a network with partial coverage, an NICD cannot communicate directly with the base station but may be able to communicate directly with other NICDs or one or more ICDs. However, such communication is not currently provided for in Technical Specifications covering wireless devices.

BRIEF DESCRIPTION OF THE DRAWINGS

The present disclosure will be better understood with reference to the drawings, in which.

DETAILED DESCRIPTION OF THE DRAWINGS

Figure 1:
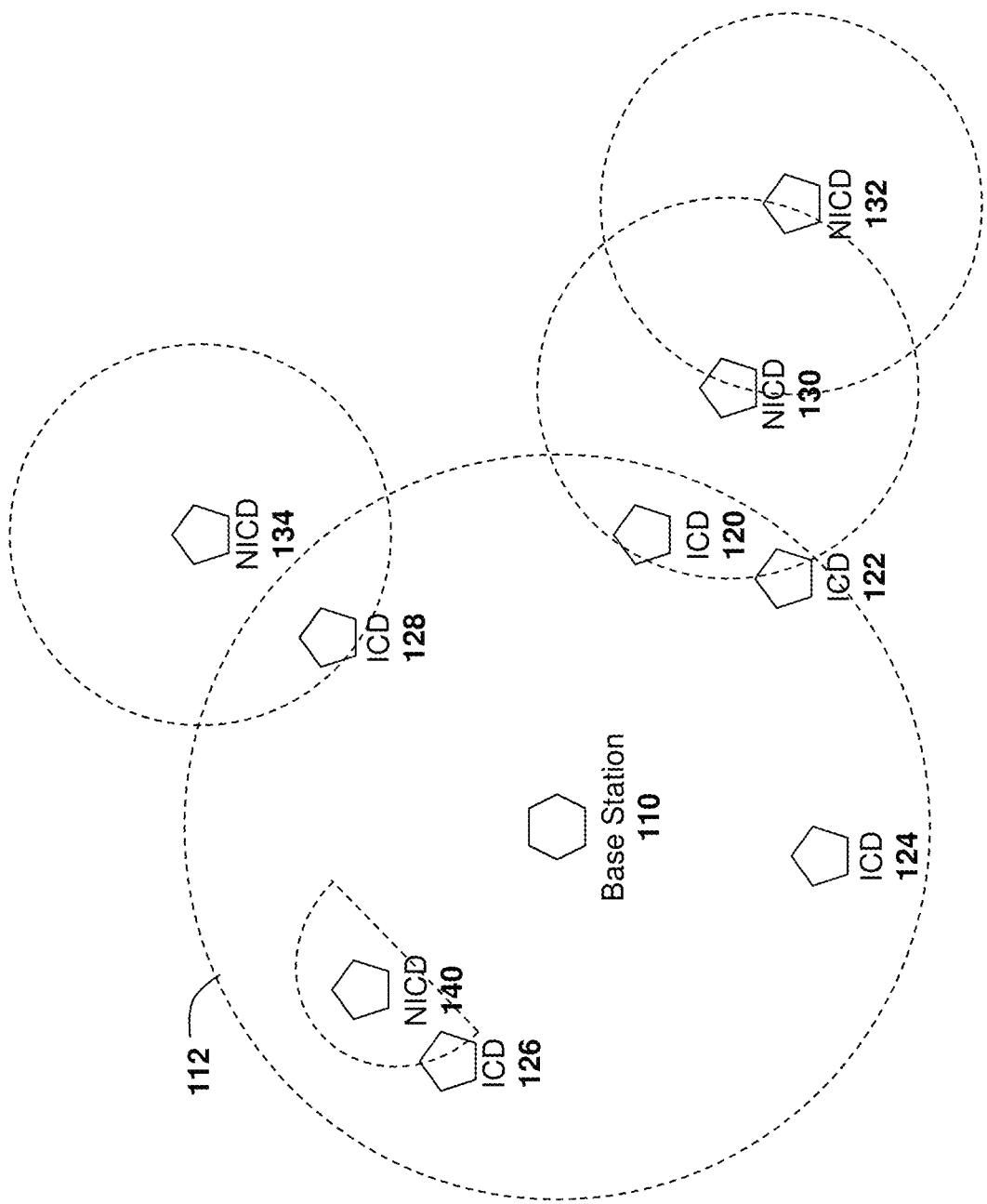
FIG. 1 is a block diagram of an example network having both in-coverage and not-in-coverage devices.

The present disclosure provides mechanisms for the discovery of wireless devices that are outside of the coverage area of a base station, but within range of other devices that are inside the coverage of the base station. As used herein, a base station encompasses any of a number of network elements, including an access point, Node-B, evolved Node-B (eNB), Cluster Head and other radio access controllers, including wireless devices with ad hoc controller functionality.

Thus, the present disclosure provides a method at a wireless device outside of base station control, the method comprising: transmitting a device presence signal for a predetermined time period; and listening for a network presence signal sent in response to the device presence signal.

The present disclosure further provides a wireless device operating outside of base station control comprising a processor, wherein the processor is configured to: transmit a device presence signal for a predetermined time period; and listen for a network presence signal sent in response to the device presence signal.

The present disclosure further provides a method at a wireless device, the method comprising: listening for a device presence signal; and transmitting a network presence signal in response to the device presence signal.

The present disclosure further provides a wireless device comprising a processor, wherein the processor is configured to: listen for a device presence signal; and transmit a network presence signal in response to the device presence signal.

Accordingly, in one embodiment of the present disclosure, paired spectrum is used for communication. In this case, a not-in-coverage device transmits a discovery signal within a predefined portion of the downlink spectrum; however, because the NICD cannot observe transmissions from the base station, the transmission of the discovery signal by the NICD may not be synchronized with downlink transmissions from the base station.

In a further embodiment, only uplink spectrum may be used for communications. In this case, the NICD transmits a discovery signal within a predefined portion of the uplink spectrum which similarly may not be synchronized with the uplink subframes of the base station. In a further embodiment, unpaired spectrum may be used for communications. Thus, the NICD transmits a discovery signal within a predefined portion of the allocated spectrum which similarly may not be synchronized with the uplink or downlink subframes of the base station.

When a not-in-coverage device transmits a discovery signal within a predefined portion of the downlink spectrum, an in-coverage device may search for discovery signals from the NICDs as part of the normal downlink signal processing. If an NICD discovery signal is detected, the ICD may coordinate with the base station to signal its presence back to the NICD within a predefined portion of the uplink spectrum.

The discovery signal transmitted by an NICD may be detected by another NICD, which may then respond with its own discovery signal. In this way, the same discovery procedure can be used to detect proximate devices when all devices are outside of network coverage.

As used herein, an in-coverage device is a wireless device operating within the coverage area and under the control of a base station, whereas a not-in-coverage device is a wireless device operating outside the coverage area and beyond the control of a base station.

Further, as used herein, a downlink communication is a communication from a base station to a wireless device and an uplink communication is a communication from a wireless device to a base station.

Reference is now made to FIG. 1 which shows a diagram of a partial network coverage scenario. In particular, a base station 110 has a geographic coverage area 112. In the example of FIG. 1, five in-coverage devices, namely devices 120, 122, 124, 126 and 128 are within the coverage and control of the Base Station 110.

Various not-in-coverage devices exist within the example of FIG. 1. In particular, the NICD device 130 is out of the coverage area of the Base Station but within range of two ICDs, namely ICD device 120 and ICD device 122.

NICD device 132 is outside of the coverage area of the base station and is also outside of the range of any ICD. However, NICD device 132 is within the range of NICD device 130.

Similarly, NICD device 134 is outside of the coverage area of base station 110 but within the coverage area of ICD device 128.

NICD device 140 is nominally in the geographic area covered by base station 110 but is unable to communicate with the base station due to an obstruction. However, NICD device 140 is within the range of ICD device 126.

In accordance with the embodiments below, once an NICD discovers a proximate device, either an ICD or another NICD, the NICD may initiate a direct device-to-device (DD2D) communication session to exchange information.

Further, radio links may have various classifications. Examples of different classifications include a macro cell network topology, an off-network cluster network topology and a broadcast group network topology, among others. Each of the above topologies is described below with regard to FIGS. 2-4.

Figure 2:
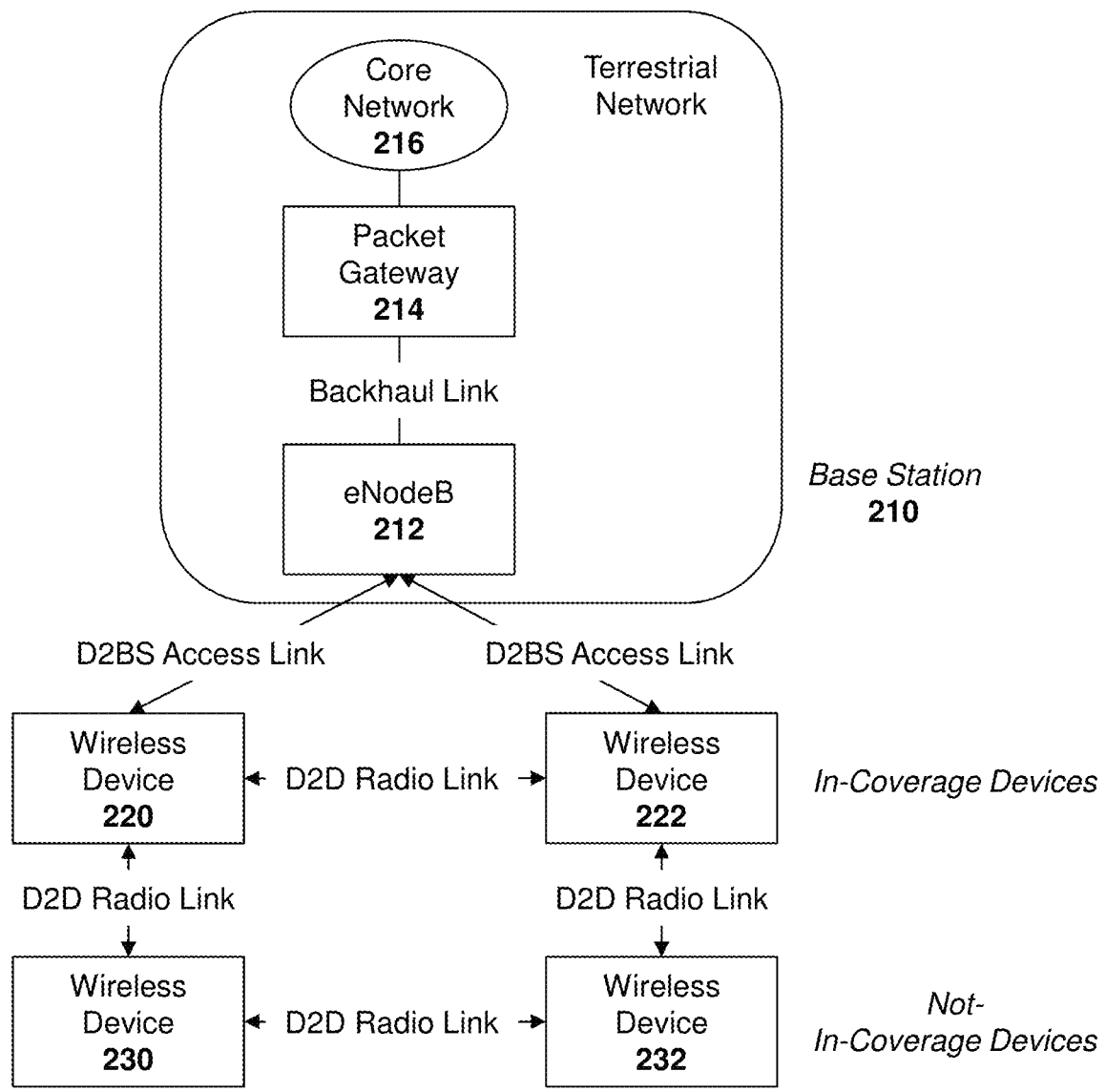
FIG. 2 is a block diagram showing communications between devices in a macro cell network topology.

Reference is now made to FIG. 2. As seen in FIG. 2 a macro cell network topology is provided including a base station 210 which comprises an evolved node-B (eNB) 212, a packet gateway 214 connected through a backhaul link to eNB 212, and a core network 216.

As seen in the example of FIG. 2, wireless devices 220 and 222 are in-coverage devices and have a device-to-Base Station (D2BS) link with eNB 212. Wireless devices 220 and 222 may further optionally have a device-to-device (D2D) link between each other.

Further, not-in-coverage devices 230 and 232 are shown in the example of FIG. 2, where device 230 includes a D2D radio link to device 220 as well as a D2D radio link to device 232.

Device 232 further may include a D2D radio link to device 222.

Figure 3:
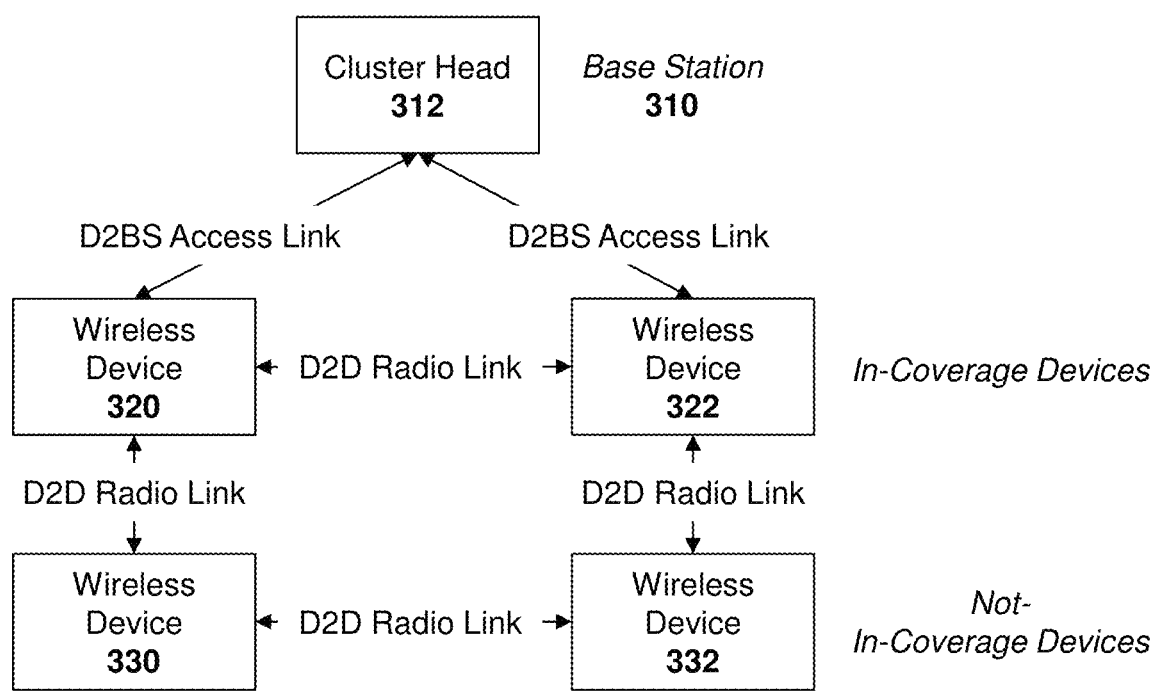
FIG. 3 is a block diagram showing communications between devices in an off-network cluster topology.

Referring to FIG. 3, an off-network cluster topology is provided. In this case, a cluster head 312 forms the base station 310 and wireless devices 320 and 322 are in-coverage devices. Devices 320 and 322 have a D2BS access link to cluster head 312. Further, devices 320 and 322 may have a D2D radio link between themselves.

Not-in-coverage devices 330 and 332 communicate through a D2D radio link. In particular, device 330 may have a D2D radio link with device 320 and with device 332.

Wireless device 332 may have a D2D radio link to device 322 and further to device 330.

Figure 4:
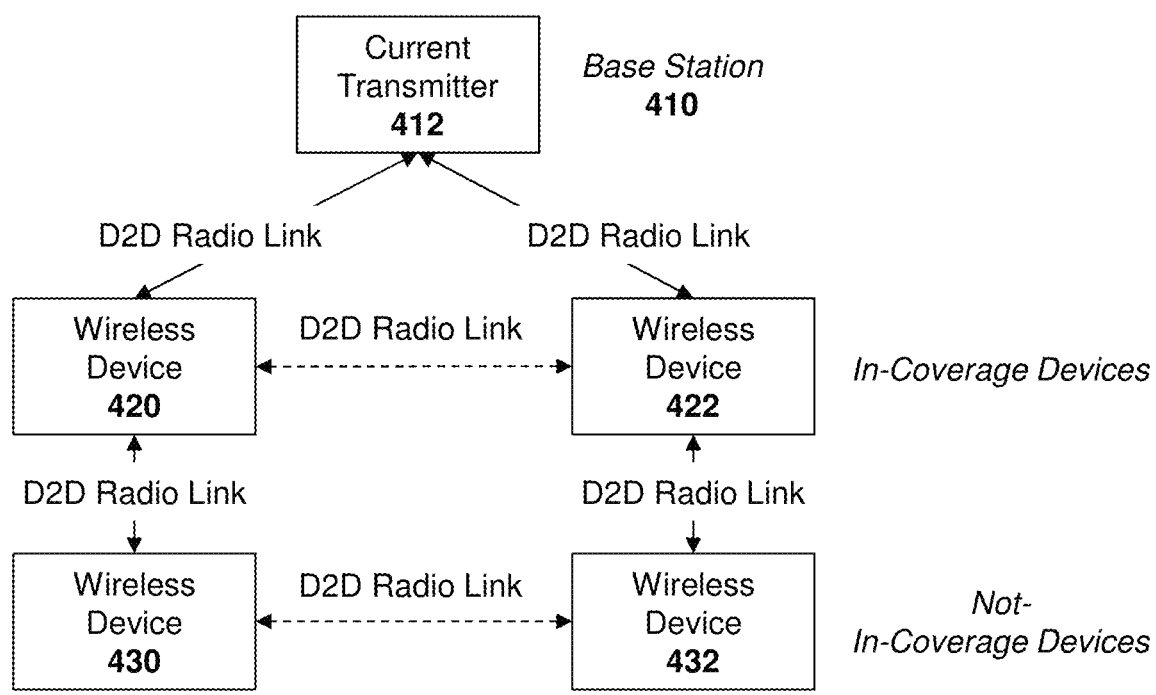
FIG. 4 is a block diagram showing communications between devices in a broadcast group network topology.

Referring to FIG. 4, a broadcast group network topology is provided in which a current transmitter 412 is the base station 410. In-coverage devices 420 and 422 have a D2D radio link with the current transmitter 412.

Not-in-coverage devices 430 and 432 further are connected through a D2D radio link. In particular, wireless device 430 may have a D2D radio link to device 420 and wireless device 432 may have a D2D radio link to device 422.

Further, a potential D2D radio link may exist between devices 420 and 422 and further a potential D2D radio link may exist between device 430 and device 432.

Depending on network policies and on wireless device capabilities, D2D links may be used in the embodiments of FIGS. 2-4 for communications between two or more ICDs, between two or more NICDs, or between ICDs and NICDs.

While radio resources in the uplink and/or downlink spectrum may be used for D2D links in a macro cellular system, uplink radio resources, including a Third Generation Partnership Project (3GPP) Long Term Evolution (LTE) Physical Uplink Shared Channel (PUSCH) may be used by ICDs to minimize interference inflicted on other devices in the vicinity of a D2D transmitter. In these cases, an ICD with D2D capabilities may be required to transmit and receive over uplink radio resources.

In some deployments, a wireless system with multiple component carriers may assign D2D links to all, or a portion of, a dedicated component carrier to avoid interference with D2BS links.

According to the 3GPP Technical Report (TR) 22.803, "Feasibility Study For Proximity Services (ProSe)", v. 12.2.0, June 2013, the contents of which are incorporated herein by reference, a device that is operating outside of a network coverage should be able to discover proximate wireless devices. Such a proximate wireless device may be another NICD or it may be an ICD. An NICD may not know a priori whether ICDs, NICDs, or both are within its transmission range.

In accordance with one aspect of the present disclosure, in order to simplify the discovery process at the NICD, the same signals and procedures may be used by the NICD to discover both NICDs and ICDs that are in proximity. Specifically, if one process is used for the discovery of ICDs and a different process is used for the discovery of NICDs, such disparate processes may require more time to discover proximate devices and may require more battery power at the NICD device.

Further, to simplify the discovery process from the perspective of an ICD, additional work that an ICD needs to perform for such discovery should be minimized. In particular, there is no guarantee that any NICDs are proximate to the ICD, so any additional work the ICD needs to do for discovery may be a waste of battery and/or radio resources at the ICD.

In accordance with another aspect of the present disclosure, the discovery process should be efficient in terms of how a spectrum is used, the amount of battery power consumed by ICDs for detecting the presence of NICDs and the amount of battery power consumed by NICDs for signalling their presence.

The signalling used by an NICD to announce its presence should be detectable by an ICD under various conditions. In particular, no time synchronization may exist between the transmitting NICD and the receiving ICD. Further, no time synchronization may exist between multiple simultaneously transmitting NICDs.

Further, a frequency offset between a transmitting NICD and a receiving ICD may exist due to transmitter misalignment. Also, a frequency offset may exist between multiple simultaneously transmitting NICDs due to transmitter misalignment.

Thus, in accordance with the embodiments described below, one or more common proximity signals are used so that a receiving device, either an NICD or an ICD, may determine when one or more transmitting NICDs are in proximity. As used herein, a common proximity signal means a signal that one or more NICDs may simultaneously transmit.

The embodiments described herein may either use paired spectrum or unpaired spectrum, or only uplink spectrum in a frequency division duplex (FDD) system. As described below, in the paired spectrum embodiments, the amount of work performed by an ICD may be reduced, the number of radio resources that must be used for proximity discovery are reduced and a proximate NICD may typically be discovered reliably and in a timely manner even when devices are unsynchronized.

The described embodiments further allow the same processes and mechanisms to be used for off-network discovery of an NICD by other NICDs and allow for detection of NICDs by an ICD operating in a battery conservation mode mode such as discontinuous reception (DRX), discontinuous transmission (DTX) or idle. The embodiments using paired spectrums may be implemented by an ICD with only basic FDD capabilities and without special D2D transmission capabilities. In other words, such ICD devices only need to have reception in the downlink spectrum and transmission in the uplink spectrum Alternatively, embodiments are described below in which FDD uplink spectrum is used for device presence signal (DPS) transmission. In this case, the NICD and ICD are both capable of sending and receiving on FDD uplink spectrum. The described embodiments do not require downlink transmission capability by the NICD.

Further, such embodiments may be utilized in unpaired spectrum, such as time division duplex (TDD) spectrum. In such cases, the NICD may not have knowledge of the uplink/downlink resources, as it does not have system frame timing. Hence, the NICD transmits a DPS in the spectrum without knowledge of using downlink or uplink resources. However, the ICD will respond using uplink resources according to the embodiments described herein.

The embodiments described herein are used for discovery of devices, and a second stage of proximity discovery, including the identification of individual transmitting devices and other procedures which may follow on from discovery such as communication are beyond the scope of the present disclosure.

Thus, in accordance with the embodiments described herein, a first stage of discovery provides procedures and mechanisms for the discovery of NICDs by ICDs. A subsequent stage of discovery provides procedures and mechanisms for the discovery of ICDs by NICDs. These procedures and mechanisms may also be used for off-network discovery of an NICD by other NICDs.

Prior to beginning the procedures described in the embodiments herein, the NICD is assumed to have knowledge of the spectrum used by base stations and ICDs in its service area. This knowledge, for example, may be preprogrammed into the NICD or may be discovered by the device while under the coverage and control of a base station. In order to simplify proximity detection performed by ICDs at the edge of coverage areas, the availability of multiple spectrum bands in some systems may be exploited.

In a basic FDD system with paired spectrum, off-network D2D discovery may utilize downlink spectrum while on-network D2D discovery may utilize uplink spectrum. Other examples are possible.

In a system with multiple component carriers, off-network D2D discovery and communication may utilize a component carrier that is different from those used for on-network D2D discovery.

In a system with overlapping coverage for multiple spectrum bands, such as a commercial spectrum band and a public safety spectrum band, off-network D2D discovery may utilize one band and on-network D2D discovery may use another band. Alternatively, off-network D2D discovery may be performed within a single spectrum band. Such single spectrum band, for example, may be within an uplink spectrum of an FDD system, within the downlink spectrum of an FDD system, or within the spectrum of a TDD system.

These and other embodiments are described below.

Presence Indication and Detection

In accordance with a first embodiment of the present disclosure, a wireless device that determines that it cannot communicate directly with a base station may assume the role of a Not-In-Coverage Device (NICD) and attempt to discover other devices that may be within proximity of the NICD. Such other devices may either be other NICDs or may be In-Coverage Devices (ICD) that still are able to communicate directly with a base station.

The NICD begins the discovery process by transmitting a Device Presence Signal (DPS) for some period of time, as described below. The device then looks for a Network Presence Signal (NPS) in response, as also described below.

The DPS is transmitted in one set of radio resources, for example within downlink spectrum, and the NPS is transmitted in a complementary set of radio resources, for example within an uplink spectrum, in one embodiment. This allows the possibility of simultaneous transmissions of DPS and scanning for NPS by an NICD in an FDD system.

An ICD that detects a DPS may begin transmitting an NPS in response. In some embodiments, an ICD only transmits an NPS if authorized to do so by the base station and at a time dictated by the base station. In other embodiments, an ICD may autonomously respond to any detected DPS using information that is-made-known-to the ICD. As used herein, "is-made-known-to" is information that may either be pre-configured into a device, or broadcast to all ICDs by a BS, or communicated individually to each device, for example using radio resource control (RRC) signalling.

Figure 5:
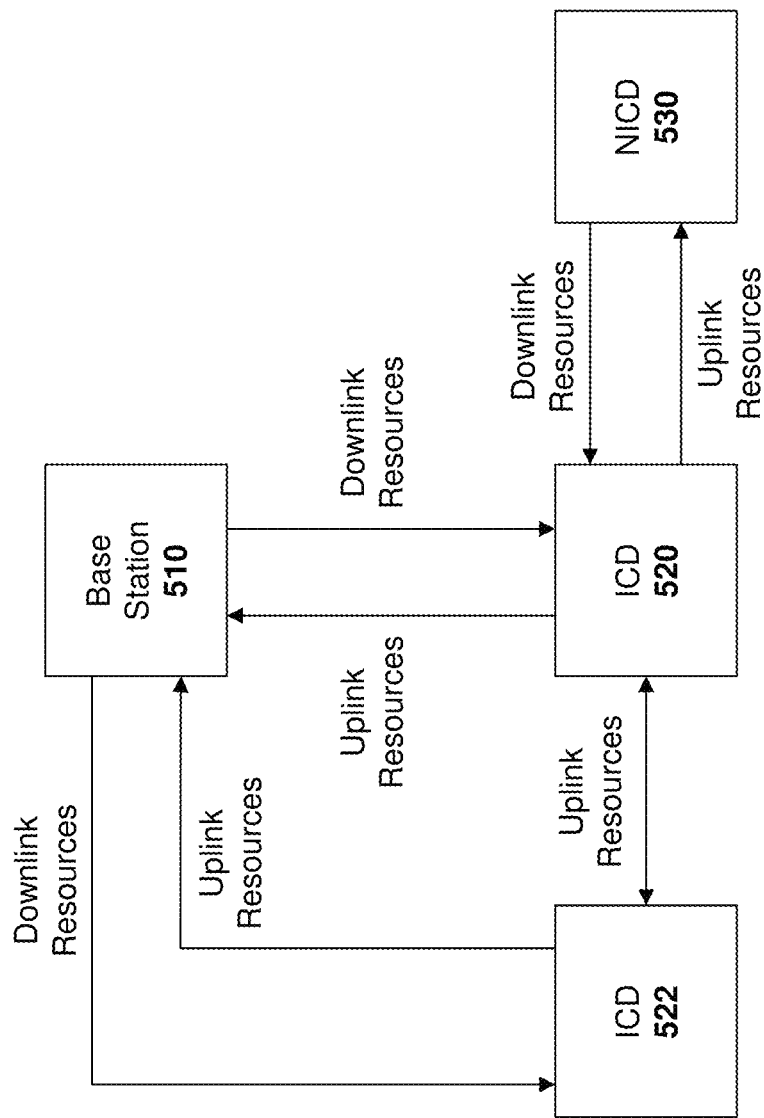
FIG. 5 is a simplified block diagram of paired spectrum usage under partial network coverage.

Reference is now made to FIG. 5, which shows a simplified diagram of a paired spectrum usage under partial network coverage. In particular, in FIG. 5, base station 510 communicates with two in-coverage devices, namely devices 520 and 522. As seen in FIG. 5, device 520 receives on downlink resources from base station 510 and further transmits on uplink resources to base station 510. Similarly, device 522 transmits on uplink resources to base station 510 and receives on downlink resources from base station 510. Further, devices 520 and 522 may communicate directly utilizing uplink resources.

A not-in-coverage device 530 is within proximity of ICD 520 in the example of FIG. 5, and in accordance with the embodiments herein may use downlink resources to communicate with ICD 522 and receive communications from ICD 522 utilizing uplink resources. The operational aspects of the ICDs and NICDs are provided below.

As indicated above, an NICD may be configured to transmit a discovery signal, referred to herein as a DPS. An ICD may be configured with information to facilitate a search for a DPS. In particular, in one embodiment an ICD may either autonomously search for DPS transmissions or it may be configured to only search for DPS transmissions under certain circumstances, such as when instructed by the base station.

Searching for a DPS only when instructed by the base station may be used, for example, when the ICD is located within a particular region, such as close to the edge of the coverage area of a base station, as either defined through geographic location, uplink transmit power level, uplink timing advance, downlink signal level from one or more cells, among other factors.

In one embodiment, after another ICD has reported detection of a DPS then a different ICD may be instructed to search for DPSs.

In a further embodiment, an ICD may be configured to only periodically search for DPSs in order to conserve battery power and complement searches by other ICDs.

In accordance with one embodiment of the present disclosure, an ICD may-be-configured with information in order to search for DPS. Such information may include which part of the spectrum, for example, component carrier or spectrum band, to search for the DPS. Further, the ICD may be configured to search particular resource blocks within a specified spectrum or subframes or symbols within a subframe to search for the DPS.

In one embodiment, different subsets of ICDs may have different configurations in order to minimize ICD battery usage while still providing continuous monitoring for DPS transmissions by the network. This may be used, for example, in scenarios such as when multiple component carriers are monitored or while some ICDs are in a low power state such as DRX.

Thus, when configured to do so, an ICD searches for transmitted DPS while processing downlink transmissions from a base station. A base station may provide different DPS configurations to different ICDs in order to optimize the overall discovery procedure.

Further, an ICD may-be-configured with how to respond to the detection of a DPS.

In one embodiment, an ICD may, if allowed by policies, autonomously begin transmitting a Network Presence Signal (NPS) as described below after the detection of a DPS if radio resources are pre-allocated for the transmission of the NPS.

Alternatively, an ICD may request resources from the Base Station for the transmission of an NPS if radio resources are not pre-allocated or if policies preclude the autonomous transmission of an NPS.

In other embodiments, an ICD may be configured only to detect DPS and then to report detection to the base station. If multiple ICDs report the detection of the DPS, the base station may select a subset of such ICDs to transmit the NPS.

For the transmission of the NPS, an ICD may-be-configured regarding where and when to transmit this signal. In particular, the configuration may include which part of the spectrum should be used for the transmission, including spectrum band and component carriers to use. The configuration may further include which resource blocks within the specified spectrum to use, and/or which subframes or symbols within a subframe to use for the NPS transmission.

In one embodiment a base station may provide different NPS configurations to different ICDs in order to optimize the discovery procedure. Such NPS configurations may include one or more of: a single signal that all ICDs must use; or a set of signals from which an ICD selects, or is configured with, one to use. The signal used by an ICD may be derived from one or more of: an aspect of the network such as a public land mobile network (PLMN) identifier; an aspect of the services offered through the network such as commercial or public safety services; an aspect of the ICD, including device class or device group; an aspect of the user such as a role within an organization, among other factors.

In some configurations, the NPS is a message similar to a random access response (referred to herein as DPS-RAR) in which the ICD conveys information, potentially including one or more of an indication of resources for the NICD to use for the response. Such resources may include a time offset relative to the DPS-RAR transmission or the initial DPS transmission.

The information may further include an identifier assigned by an ICD, potentially from the base station, for further control and/or data transmission. This identifier may be used for transmission or reception of control information, data, or both.

The DPS-RAR may also convey power control instructions, a timing advance based on the DPS transmission, and/or an indication of information to be sent by the NICD in the next transmissions, among other information. For example, one or more specific information elements may be requested in the DPS-RAR, such as a user equipment (UE) identifier, a ProSe identifier, a group identifier or some other information that may be needed in messages from the NICD following the DPS-RAR. The indication within the DPS-RAR may be used to indicate the format or content of such messages.

The ICD "may-be-configured" with information for DPS/NPS operations. As used herein, the term "may-be-configured" for an in-coverage device is synonymous with information that "is-made-known-to" the device, as defined above. The information that "may-be-configured" for the ICD may include one or more of the following:
  DPS resources (e.g. number of resource blocks (RBs), and location of RBs, DPS configuration type, etc);
  DPS search configuration parameters (e.g. periodicity, system frame number start, search duration, etc);
  DPS detection reporting configuration (e.g. signal strength detection threshold, reporting period, etc);
  NPS response configuration (e.g. NPS signal configuration, etc); or
  NPS response procedure configuration (e.g. report to BS first, respond directly, etc).

The ICD may also be configured with DPS search configurations that may include one of more of:
  Periodicity and duty cycle of on/off search duration (for example: search for N frame(s), then DRX for M frame(s));
  Start timer for search, after which the UE discontinues search until re-configured by BS;
  System frame number start (so that each ICD can be given different start SFNs for their periodic searches by the BS, and together search the resources continuously); or
  Resources in which to search (if not statically configured).

With regard to NICDs, operational aspects may be provided in two categories. In a first category, the operational aspects of an NICD deal with network discovery. In a second aspect, the operational aspects of NICDs may deal with proximate NICD and ICD discovery.

With regard to network discovery, an NICD is not required to decode any reference signal, including an LTE reference signal, before starting the discovery process.

An NICD may begin by transmitting a Device Presence Signal (DPS) without necessarily detecting the presence of a network or other devices. In other words, the NICD may be in a "lighthouse" mode of operation.

An NICD may begin searching for the Network Presence Signal (NPS) either before sending the DPS to detect the presence of ICDs that are beaconing or after sending the DPS to detect a response to its transmission, or both.

In some embodiments, an NICD may-be-configured with information governing the transmission of the DPS signal. As used herein, the term "may-be-configured" for a not-in-coverage device includes information that may be pre-configured (e.g. during deployment) or manually configured (e.g. by the user) into the device, or information that "is-made-known-to" the device when it was previously operating as an In-Coverage Device. For example, the NICD may-be-configured when it will transmit the DPS such as the duration of the transmission burst, period between bursts, among other factors. The NICD may also be configured with information governing where it will transmit the DPS, including whether the DPS is transmitted relative to a spectrum edge or a spectrum centre frequency.

An NICD may also be configured with information governing the reception of the NPS. This information may include when the NICD will attempt to receive the NPS relative to its own transmission of the DPS and what region of the spectrum it will use to attempt to receive the NPS.

The information configured for the DPS may indicate a single signal that all NICDs must use, or may include a set of signals from which one is selected by the NICD to use. The signal selected by the NICD may be derived from one or more of: an aspect of the service request; an aspect of the device; or an aspect of the user. For example, an aspect of the service request may include emergency service, delay tolerance, discovery type, among other factors. An aspect of the device may include a device class, group, or home PLMN, among other factors. An aspect of the user may include a role within an organization, for example.

With regard to the proximate NICD discovery operational aspects, an NICD may begin to search for a DPS before sending its own DPS or after sending its own DPS. The search before sending the own DPS may be to detect the presence of other proximate NICDs.

In a further embodiment, an NICD may also begin transmitting an Off-Network Presence Signal (NPS-O) only if it detects the presence of a DPS. An NICD may-be-configured with information governing the reception of the DPS and when it will attempt to receive the DPS relative to its own transmission.

An NICD may further be configured with information governing the transmission of the NPS-O. Such information may include when the NICD will transmit the NPS-O, including the duration of the transmission burst, period between bursts, among other factors. The NICD may also be configured with information on where to transmit the NPS-O relative to the spectrum edge or spectrum centre frequency, among other options.

An NICD may-be-configured with information governing the reception of the NPS-O including when it will attempt to receive the NPS-O relative to its own transmission of the DPS and where it will attempt to receive the NPS-O including various regions within the spectrum.

Device Presence Signal

As provided above, an NICD may begin the discovery process by transmitting a Device Presence Signal. The DPS may be discovered by either an In-Coverage Device or by another NICD.

In one embodiment, the DPS is transmitted by an NICD and is characterized as follows:

The DPS is transmitted in predefined downlink radio resources. While uplink resources may be used for D2D communications while under the coverage of a base station, the DPS transmission uses predefined downlink resources.

The DPS can be detected by an ICD during the normal course of processing downlink signals from a base station. In other words, an ICD is not required to perform a significant amount of additional work in order to detect DPS.

A DPS can be detected without requiring symbol time synchronization between the transmitting NICD and receiving ICD.

The DPS may also be used by an NICD to detect the presence of another, proximate NICD.

In some cases, the base station may mute transmissions on all or some of the time-frequency resources for ICDs to detect possible DPS transmissions from NICDs.

In some embodiments, the DPS may not convey any device specific information or any information other than the presence of the proximate device. Other, follow on procedures may be required to identify the proximate device and, if necessary, establish communications with that device.

Based on the above, the Device Presence Signal may be considered to be an unmodulated physical signal and thus the detection of the signal does not require time synchronization between a transmitter and receiver. In one embodiment, the DPS may be a simple tone where a few subcarriers are reserved for the NICDs to send the signal.

A DPS, in some embodiments, may be transmitted over a predetermined set of subcarriers. In some of these embodiments, the signal spans only one or a few resource blocks (RBs).

Further, in some instances, the arrival of a new NICD and subsequent transmissions of a DPS may be relatively rare events and therefore the signal itself should use minimal resources in both time and frequency. Thus, resources reserved by the network for potential transmission and detection of DPS may be minimized in some cases.

In other cases, signals from a group of NICDs may arrive in a burst. This may, for example, occur due to a commercial or a public event or a public safety incident. In this case, multiple NICDs may simultaneously transmit a DPS on the same resources. In this case, detection of the DPS should be immune to overlapping, unsynchronized transmissions.

In some FDD embodiments, the DPS may be transmitted in sub-carriers of downlink spectrum while in-network D2D links utilize uplink spectrum. Such embodiments are described above with regard to FIG. 5.

In other FDD embodiments, the DPS may be transmitted in sub-carriers of the uplink spectrum that are distinct from those used for in-network D2D links.

Since an NICD transmitting a DPS does not have any knowledge of the timing at the ICDs, the DPS signal may have several characteristics. One characteristic of the DPS is that it may occupy a time window large enough to increase the probability that the DPS transmission will overlap with the monitoring windows of ICDs. In other words, the time interval for the transmission of the DPS by an NICD may be long compared to the time intervals over which an ICD may be scheduled to receive or monitor regular transmissions from the base station.

A further characteristic of a DPS may be that any portion of the DPS signal with a length equal to the detection granularity at ICDs should be detectable. For example, since an ICD may decode individual orthogonal frequency division multiplexing (OFDM) symbols rather than complete subframes, then any portion of the DPS with a length equal to one OFDM symbol should be detectable.

In one embodiment, the DPS is not transmitted continuously by the NICD. In other words, the NICD may take breaks between transmissions of the DPS. Such intervals for transmitting form a trade-off between NICD battery usage and the probability of failure to detect the presence of the NICD.

Further, because the NICD transmitting the DPS does not have any knowledge of resource block assignments aimed at ICDs, an NICD may-be-configured with the radio resources to use to transmit the DPS.

In one embodiment, in an FDD system, spectrum at one or both of the downlink band edges may be allocated for DPS transmission to maximize contiguous physical downlink control channel (PDCCH)/physical downlink shared channel (PDSCH) resource allocations and transmissions. In other FDD embodiments, the NICD may be configured to transmit the DPS within other resource blocks of either the downlink or the uplink spectrum.

Where possible, a base station may avoid scheduling the use of such resources when there is a possibility of interference from an NICD. In other words, such resources may only be scheduled for use by ICDs that are not located at the edge of a coverage area. Further, in some cases the base station may mute transmissions on all or some of the time or frequency resources for ICDs to detect possible DPS transmissions from NICDs.

Although an NICD may have nominal frequency alignment with an ICD, the DPS may be immune to the effects of frequency offset, especially if the DPS is transmitted in a small number of OFDM sub-carriers.

Figure 6:
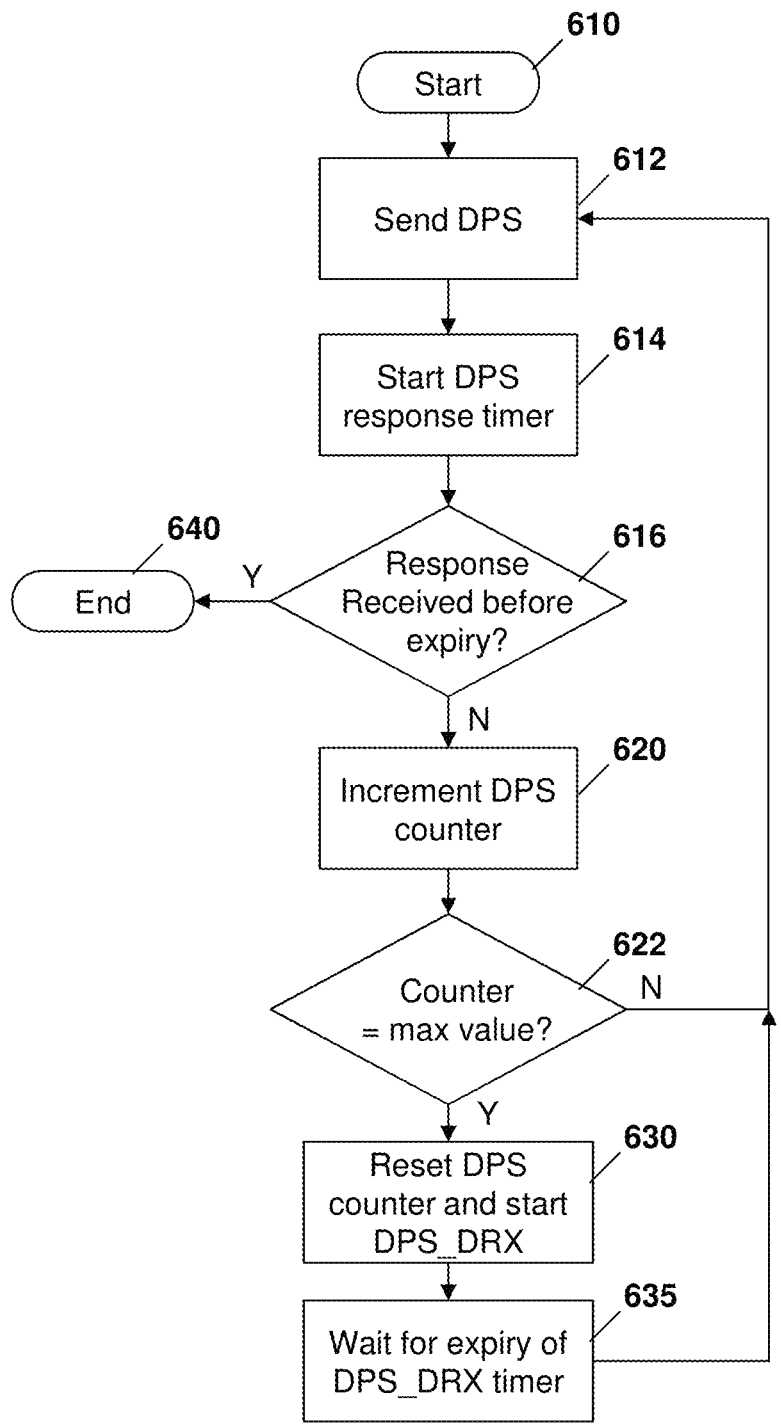
FIG. 6 is a flowchart showing an example process for sending a discovery presence signal.

The DPS transmissions may be sent in accordance with a predefined procedure. Reference is now made to FIG. 6. According to the process of FIG. 6, an NICD starts at block 610 and proceeds to block 612 in which a DPS is sent.

After the sending of a DPS, the process proceeds to block 614 in which the NICD may start a DPS response timer. In some cases the value of the timer may be a randomly selected time similar to a random back-off operation. In other cases, the timer may be preconfigured with a certain value.

The process then proceeds to block 616 in which a check is made to determine if a response is received prior to the expiry of the timer, or conversely if the timer expires without receiving an NPS or other response. If no response is received prior to expiry, the process proceeds to block 620 in which the NICD may increment a DPS_counter by 1.

The process then proceeds from block 620 to block 622 in which a check is made to determine if the DPS_counter has reached a maximum. If no, the NICD may select another DPS according to transmission parameters and proceeds back to block 612.

If the DPS_counter does reach a maximum, the process proceeds to block 630 in which the DPS counter may be reset to zero and a DPS_DRX_timer may be started. During the DRX period the NICD stops sending the DPS.

From block 630 the process proceeds to block 635 to wait for expiry of the DPS_DRX timer. When the timer expires, the process proceeds back to block 612 to resume transmission of DPS.

From block 616, if a response is received before the expiry of the DPS response timer, the process proceeds to block 640 and ends.

DPS: Zadoff-Chu Sequence

In one embodiment, the DPS signal may be a narrowband signal occupying a small portion of the allocated band. The DPS may be based on a Zadoff-Chu (ZC) sequence. Because the transmitter and receiver are not time synchronized, each element of the ZC sequence is transmitted as a continuous phase signal. In other words, the transmission of an element occurs without an OFDM symbol cyclic prefix on one of the allocated OFDM subcarriers.

The length of the ZC sequence (i.e. the number of elements in the sequence) is constrained by the number of subcarriers allocated for transmission of the DPS. The length of the sequence may be chosen to counteract the effects of frequency offset due to transmitter misalignment. For example, in some embodiments, the number of allocated subcarriers may be not less than 11.

The ZC sequence used by the transmitter may be a ZC base sequence. Because the transmitter and receiver are not time synchronized, the ZC sequence detected at the receiver may be a phase-shifted or cyclically-shifted version of the base sequence. The length of the sequence may be chosen to counteract the effects of time offset due to lack of synchronization. For example, in some embodiments, the number of allocated subcarriers should not be less than 11.

For example, in one embodiment the DPS may occupy one resource block with 12 OFDM subcarriers at the edge of the configured spectrum band. In this case, 11 subcarriers are used for the ZC sequence and one subcarrier is used as a guard band to compensate for frequency offset.

Each ICD that is capable of detecting a DPS, and each NICD, may-be-configured with the ZC base sequence to be transmitted as a Device Presence Signal. This can be a single ZC base sequence that all NICDs must use or a set of ZC base sequences from which an NICD selects a sequence.

If an ICD is configured with a set of ZC base sequences, it may attempt to detect all sequences in the set.

DPS: Direct Sequence Spread Spectrum

In an alternative embodiment, the DPS may be a wideband signal occupying a large portion of the allocated band. The DPS may be spread in time using a "Gold code" in a Direct Sequence Spread Spectrum (DSSS) signal.

The DSSS can be a single Gold sequence that all NICDs must use or a set of Gold sequences from which an NICD selects a sequence. Further, the spreading length and the chip rate of the DSSS signal may be configurable.

In one embodiment, the wideband DPS uses a short sequence length, for example 16, and is repeated in several clustered bursts over a frame period. An ICD attempting to detect the DPS during one subframe of the frame would have at least an opportunity to receive it.

In another embodiment, the wideband DPS uses a longer sequence length and chip rate such that the DSSS signal occupies the duration of an OFDM symbol and the approximate bandwidth of the system.

In one embodiment, the chip rate ($R_C$) is the same as, or an integer fraction of, the basic LTE sampling rate ($R_S$) while also ensuring that the bandwidth of the DSSS signal does not exceed the LTE channel bandwidth. In other words, $R_C = (R_S/n)$ Mcps where $R_S = 30.72$ MHz.

In this case, the value of integer n may be large enough to ensure the bandwidth occupied by the DPS ($B_{DPS}$) does not exceed the system bandwidth ($B_S$). This is represented in equation 1 below.

$$B_{DPS} \approx R_C = R_S/n < B_S \qquad (1)$$

To fit within m OFDM symbol times, the maximum length of the DSSS sequence is defined by equation 2 below:

$$L_{max}^{seq} = (m*T_{sym})/(1/R_C) \qquad (2)$$

In equation 2 above, $T_{sym}=66.67$ μsec in the OFDM symbol duration without a cyclic prefix. For example, in a 10 MHz band, setting n=4 gives a chip rate $R_c=30.72/4=7.68$ Mcps, and setting m=1 gives a sequence length $L_{max}^{seq} = (1*66.67)/(1/7.68)=512$.

In some variants, a Gold code of length $L^{seq}=511$ may be used. In other variants, a shorter sequence may be used to simplify reception. For example, setting $L^{seq}=255$ would occupy half of an OFDM symbol.

In some embodiments, to ensure that an ICD would always have at least one opportunity within a frame period to receive the DSSS signal within a regular downlink symbol receive window, an NICD may send a DPS with ten iterations of the DSSS signal in a 10 millisecond interval. In other words, ten 1 millisecond iterations in one frame period. In each 1 millisecond iteration, a non-integer symbol time offset ($T_{sym}^{offset}$) is applied. In other words, equation 3 below may be utilized.

$$T_{sym}^{offset} = 1000 - (T_{sym}/10) = 993 \text{ μsec} \qquad (3)$$

Network Presence Signal

A Network Presence Signal is transmitted by an In-Coverage Device to indicate that it has detected the transmission of a Device Presence Signal by an NICD. Further, an off-network variant of the NPS, referred to herein as an NPS-O, may be transmitted by an NICD to indicate that it has detected the transmission of the DPS by another NICD.

The NPS in response to a DPS transmitted in uplink spectrum may be the same as that for the DPS transmitted in downlink spectrum as described above. The NPS may further resemble a random access response (referred to herein as DPS-RAR), which is described below. The DPS-RAR may also be used in response to a DPS sent in downlink or uplink spectrum.

The NPS is characterized by being transmitted either by an ICD or an NICD in response only to detected DPS, obviating a need for reserving radio resource for NPS transmission on a regular basis. The NPS, in accordance with the embodiments herein, is transmitted in predefined uplink radio resources. Such communication generally comprises use of uplink radio resources for D2D communications while under the coverage of a cellular base station.

The NPS may be transmitted by an ICD during the normal course of transmitting uplink signals to a base station. In other words, an ICD is not required to perform significant additional work to transmit an NPS. Further, the NPS can be detected by an NICD without requiring symbol time synchronization between the transmitting ICD or NICD and the receiving NICD.

In some embodiments, the NPS may be used by the receiving NICD to acquire symbol synchronization with the transmitting ICD or NICD. However, in some embodiments the NPS may not convey any device specific identification or information other than the presence of the proximate device. Follow-on procedures may be used to identify the proximate device and, if necessary, establish communications with that device.

Thus, in order to respond to a detected DPS signal, an ICD may transmit an NPS over a different set of subcarriers.

In an FDD system, the NPS may be transmitted in sub-carriers of the uplink spectrum while DPS may use the downlink spectrum. In other FDD embodiments, the DPS may also be transmitted on the uplink spectrum, in which case the NPS may be transmitted in sub-carriers of the uplink spectrum that are distinct from those used for the DPS.

The characteristics of the NPS are similar to those of the DPS. Multiple ICDs may independently transmit an NPS on the same resources and, therefore, detection of the NPS may be immune to overlapping (but possibly synchronized) transmissions. Further, although an NICD may have nominal frequency alignment with an ICD, the NPS should be immune to the effects of small frequency offsets.

In some embodiments, the NPS may provide clocking information to allow the receiving NICD to acquire symbol synchronization with the transmitting ICD. Such symbol synchronization may be a point within a search window of a maximum correlation of a known ZC sequence, for example.

Further, the NPS may also provide the clocking information to allow the receiving NICD to acquire frame alignment with the transmitting ICD.

In one embodiment the ICD transmits a different ZC sequence in one or more known symbols of a frame.

An NICD may-be-configured with the radio resources used to receive the NPS. In this case the base station may schedule use of the resources by one or more ICDs only when an ICD has reported detection of a DPS from an NICD. Also, the NPS may not be transmitted continuously by the ICD. In this case, the ICD may take breaks between transmissions of the NPS. As with the transmission of the DPS, there is a trade-off between the ICD battery usage and probability of failure to detect the presence through the use of the breaks between the transmissions of the NPS.

NPS: PSS/SSS Reflection by an ICD

In one embodiment the NPS is, in effect, a primary and secondary synchronization signal (PSS and SSS, respectively) reflected in the uplink spectrum by an ICD.

In other embodiments the NPS is, in effect, a PSS only.

Spectrum may be allocated for NPS transmission to avoid conflicts with other transmissions in the uplink spectrum. In other words, spectrum may be allocated at the edge of the band to maximize continuous PUSCH resource allocations and transmissions or the spectrum may be allocated away from the edge of the band to avoid conflicts with PUCCH transmissions. In a system with multiple component carriers, this may be configured on a per-channel basis.

A PSS sequence, dubbed $NPS^{PSS}$ herein, that is-made-known-to all devices may be transmitted by an ICD in one or more symbols to allow the receiving NICD to acquire symbol synchronization with the transmitting ICD.

The base station may assign a different $NPS^{PSS}$ sequence to different responding ICDs or groups of ICDs so the NICD can distinguish between the ICDs or groups of ICDs.

In some cases these groups may be statically configured so an NICD is able to look for a specific group or group type by the NPS sequence. Further, the set of possible sequences is known to the NICD as well, which scans the appropriate resources looking for one or more of these responses.

A known SSS sequence, dubbed $NPS^{SSS}$, may be transmitted by an ICD in one or more symbols relative to the $NPS^{PSS}$ to allow the receiving NICD to acquire frame alignment with the transmitting ICD.

The base station may assign a different $NPS^{SSS}$ sequence to different responding ICDs or groups of ICDs so that the NICD can distinguish between the ICDs or groups of ICDs. In some cases these groups may be statically configured so that an NICD is able to look for a specific group or group type by the NPS sequence.

Further, the set of possible sequences is known to the NICD as well, which may scan the appropriate resources looking for one or more of these responses.

NPS: PSS/SSS Transmission by an NICD

For off-network operation, it may be desirable for one NICD to synchronize its transmissions with another NICD. This may be accomplished in accordance with the following.

A known PSS sequence, dubbed $NPS\text{-}O^{PSS}$, may be transmitted by an NICD that detects transmission of a DPS. The ZC sequence used for the $NPS\text{-}O^{PSS}$ may be different from the sequence used for the $NPS^{PSS}$.

An NICD may-be-configured with the $NPS\text{-}O^{PSS}$ sequence to use, as well as have uplink spectrum allocated for NICD transmissions. In this case, the uplink spectrum allocated for the uplink transmission of the $NPS\text{-}O^{PSS}$ may be the same as that allocated for the transmission of the $NPS^{PSS}$ by an ICD, or it may be different.

A known SSS sequence, referred to as a $NPS\text{-}O^{SSS}$, may be transmitted by an NICD with one or more symbols relative to the $NPS\text{-}O^{PSS}$ to allow the receiving NICD to acquire frame alignment with the transmitting NICD. The sequence used for the $NPS\text{-}O^{SSS}$ may be different from that used for the $NPS^{SSS}$.

DPS-RAR Transmission by an ICD

In further embodiments, the NPS may be a message (referred to herein as DPS-RAR) similar to a random access response in which the ICD conveys information. Such information may include one or more of: an indication of resources for the NICD to use for the response, which may include a time offset relative to the DPS-RAR transmission, or the initial DPS transmission; an identifier assigned by the ICD, potentially by the base station, for further control and/or data transmission, where the identifier may be used for transmission or reception of the control/data or both; a timing advance based on the DPS transmission received at the ICD; power control instructions based on the DPS transmission received at the ICD; an indication of information required from the NICD in the next transmissions, including, in some cases, one or more specific elements such as the user equipment identifier, ProSe identifier, group identifier or other information that may be needed by the NICD.

The DPS-RAR transmission may occur after a DPS transmission by an NICD. In some embodiments the ICD may first report detection of the DPS to the base station. The base station may then issue information needed for the ICD to provide the DPS-RAR, including resources for where to transmit the DPS-RAR and potentially information for one or more of its contents. The ICD can then make the DPS-RAR transmission on the uplink resources according to the uplink assignment provided by the base station.

In some embodiments, where the ICD to base station communications are in a different band than the NICD to ICD communications, then the base station may provide an uplink grant to the ICD for DPS-RAR or indicate resources for future NICD responses to the ICD.

In some embodiments of cross-band discovery where the base station does not provide guidance of the uplink grant, the ICD may select a resource for transmission for the DPS-RAR, in response to the DPS from the NICD, where the DPS-RAR is transmitted within the expected NPS response window relative to the received DPS transmission. However, in some of these variants, the Base Station may still provide one or more other information elements to the ICD to be passed to the NICD, including identifier information or even a cell radio network temporary identifier (C-RNTI) for the NICD to use for further communications with the ICD and potentially with the base station through the ICD.

In further variants of the cross-band case, as indicated above, the ICD may respond with an NPS (DPS-RAR) without reporting DPS detection to the base station.

The physical format of the DPS-RAR may be a PUSCH D2D type transmission. In order to simplify the transmission, various features may be used. These include a synchronization channel which may be included to provide easier detection by the NICD. Such a synchronization channel may however result in more reference signals embedded within the PUSCH transmission. Further, in one embodiment, the ZC sequence embedded in the synchronization channel in the PUSCH may match the ZC used by the NICD in the DPS transmission.

Further features for such communications may include the NPS (DPS-RAR) being transmitted in the middle RBs of the spectrum bandwidth, where the NPS is a known frequency bandwidth. For example, the NPS may be fixed to 3 RBs. Other examples are however possible.

Further, in some cases the NPS bandwidth and frequency resource location is the same as the DPS configuration.

In one embodiment, the ZC sequence identifier or a signal identifier used in the DPS sent by the NICD is conveyed in the DPS-RAR message by the ICD to prevent ambiguity if multiple NICDs have sent DPSs. Such ambiguity may be prevented by having the PUSCH information scrambled by the identifier; synchronization in the PUSCH using the same sequence; fields in the message indicating the identifier; or header control field appended to the message indicating the identifier, among other options.

Alternative Embodiment Using FDD Uplink Spectrum

In further embodiment, the NICD may transmit using FDD uplink spectrum for DPS transmission, rather than downlink spectrum as described above. In this embodiment, the DPS may be similar to that described above in terms of the physical signal and operation, or may have some similarities to a random access channel (RACH) for system access to the ICD.

The NICD may receive a response in terms on an NPS as described above where the NPS has the similar operational details. Alternatively, the NPS may have a signal structure similar to that of a random access response (RAR).

Thus, in accordance with the present embodiment, an Uplink Device Presence Signal (UL-DPS) is transmitted in the uplink spectrum by the NICD to begin discovery of that device either by an in-coverage device or another NICD.

Figure 7:
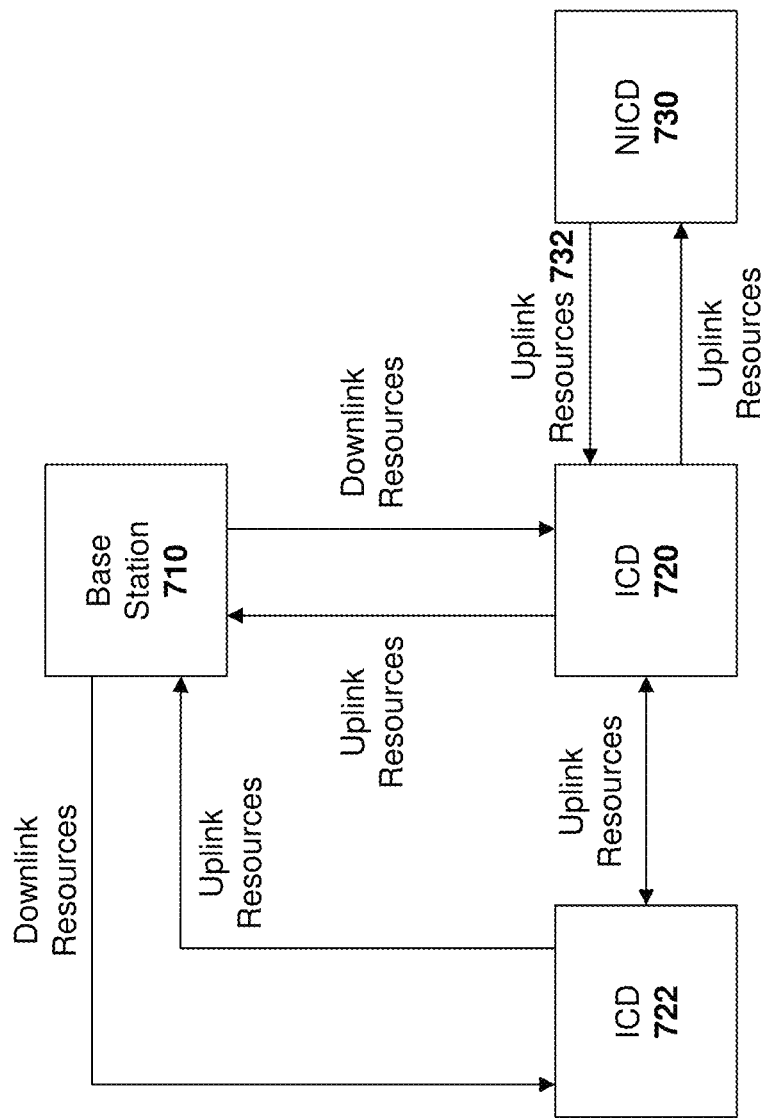
FIG. 7 is a simplified block diagram of uplink spectrum usage under partial network coverage.

Reference is now made to FIG. 7, which shows the signaling configuration where a base station 710 communicates with ICDs 720 and 722.

An NICD 730 does not have network coverage, and in accordance with the present embodiment may send an uplink DPS utilizing uplink resources, as shown with arrow 732.

The UL-DPS is transmitted in one set of resources and the NPS is transmitted in a complimentary set of radio resources. Both the UL-DPS and the NPS use uplink resources.

Because the NICD transmitting UL-DPS does not have knowledge of resource block assignments aimed at ICDs, an NICD may be configured with radio resources used to transmit the UL-DPS. In one embodiment, the radio resources allocated for the transmission of the UL-DPS may be towards the center of the uplink spectrum in order to avoid possible conflicts with the PUCCH allocations at the edges of the uplink spectrum.

Further, the base station may avoid scheduling the use of such uplink resources when there is a possibility of interference from an NICD. For example, the resources may only be scheduled for use by ICDs that are not located at the edge of the coverage area. Also, in some cases, the base station may limit transmissions on all or some of the time frequency resources for ICDs in order to protect possible UL-DPS transmissions from NICDs.

An ICD may be configured with information for DPS/NPS operations. Such information may include one or more of the following:

DPS resources (e.g. number of RBs, and location of RBs, DPS configuration type, etc);

DPS search configuration parameters (e.g. periodicity, system frame number start, search duration, etc);

DPS detection reporting configuration (e.g. signal strength detection threshold, reporting period, etc);

NPS response configuration (e.g. NPS signal configuration, etc); and

NPS response procedure configuration (e.g. report to BS first, response directly, etc).

Further, the ICD may-be-configured with a DPS search configuration, which may include one or more of:

Periodicity and duty cycle of On/off search duration (for example: search for N frame(s), then DRX for M frame(s));

Start timer for search, after which the UE discontinues search until re-configured by BS;

System frame number start (so that each ICD can be given different start SFNs for their periodic searches by the BS, and together search the resources continuously); and Resources in which to search (if not statically configured).

As described above with regard to the DPS and NPS, the uplink signals may be variants of the Zadoff-Chu sequences or DSSS.

Further, in at least one embodiment, a variant of the physical random access channel (PRACH) may be used for the uplink DPS. Such channel may use a Zadoff-Chu sequence. In this variant, the DPS-PRACH is sent by the NICD in the uplink resources.

The signal may be sent in the centre resource blocks in one embodiment. Further, in some variants, the DPS-PRACH signal may be sent in radio resources that are allocated towards the centre of the uplink spectrum. For example, such resources may be sent in the center three resource blocks, as opposed to, for example, a Revision 11 LTE PRACH, which is six resource blocks in bandwidth.

In some cases, the base sequence or other scrambling methods or code differentiation used in the configuration for the transmission of the DPS-PRACH may be reserved, and not used for LTE PRACH. In this manner an LTE base station will not confuse the reception of the DPS-PRACH signal as a LTE PRACH for system access.

Based on the above, an NICD may select a DPS-PRACH sequence at random from a set of sequences which are predefined. In one embodiment, there is only one sequence that is used for this purpose, but in other embodiments multiple sequences may exist.

In other embodiments, the set of sequences may be used to provide some response identification, if a number of NICDs are trying to simultaneously send a DPS to an ICD. In this variant, the ICD may use the DPS sequence identifier as an indication in the NPS (DPS-RAR) to address a specific NICD.

Similar to the paired spectrum embodiment described above with regards to FIG. 6, in the present embodiment the following signalling procedure may be used. An uplink DPS transmission may be sent when the NICD starts the discovery procedure or when an uplink DPS_DRX_timer expires. After sending the uplink DPS, an NICD may start an uplink DPS response timer. In some cases this may be a randomly selected time similar to a random back-off operation. If the timer expires without receiving an NPS or other response, the NICD may increment the uplink DPS_counter by 1.

If the uplink DPS_counter is less than the maximum value then the NICD may select and send another uplink DPS according to transmission parameters. Otherwise, the NICD may reset the uplink DPS_counter and start a DPS_DRX timer.

Thus, the uplink DPS is transmitted by an NICD and uplink resources can be detected without requiring symbol time synchronization between the transmitting NICD and the receiving ICD. In some cases, the base station may need transmissions on all or some of the time-frequency resources for ICDs to detect possible uplink DPS transmissions from NICDs. The uplink DPS may also be used by other NICDs to detect the presence of the NICD.

An uplink DPS may not convey any device specific identification or information other than the presence of the proximate device. Other follow-on procedures as described above may be used to establish communications and provide identification, and such other follow-on procedures are beyond the scope of the present disclosure.

The Network Presence Signal that is transmitted in response to the uplink DPS is a variant of the NPS described above. If it is sent by another NICD it is an off-network presence signal and in one embodiment the uplink NPS that is sent in response to the uplink DPS may have a form resembling a random access response (DPS-RAR).

Wireless Device Capabilities

In accordance with the embodiments of the present disclosure, a Wireless Device with basic D2D capabilities should be configured to receive, as well as transmit over uplink resources while operating under the control of a base station, including an ICD. In order to make use of downlink spectrum for DPS, a wireless device with off-network communications capabilities may also be able to transmit, as well as receive, over downlink radio resources.

A D2D-capable ICD that does not have off-network communications capabilities may only be required to implement basic D2D functionality of receiving and transmitting over uplink resources, as well as receiving over downlink radio resources.

An ICD that does not have D2D communications capabilities but does have NICD detection capabilities is only required to implement the basic cellular FDD functionality of receiving over downlink radio resources and transmitting over uplink radio resources to implement the embodiments of the present disclosure.

In some embodiments, an NICD may also be capable of full duplex D2D communications when operating off-network. In a system with paired spectrum, full duplex capability implies transmission in downlink resources and reception in uplink resources. This is the opposite of ICD behaviour.

In a system with multiple components carriers, full duplex capabilities may imply transmission on one component carrier and reception on another component carrier. An NICD may-be-configured with component carriers to use, respectively, for transmission and reception. In some embodiments, an NICD with full duplex capabilities may operate in half duplex FDD mode when communicating with an ICD.

Discovery Procedures

Discovery of an NICD by an ICD

Figure 8:
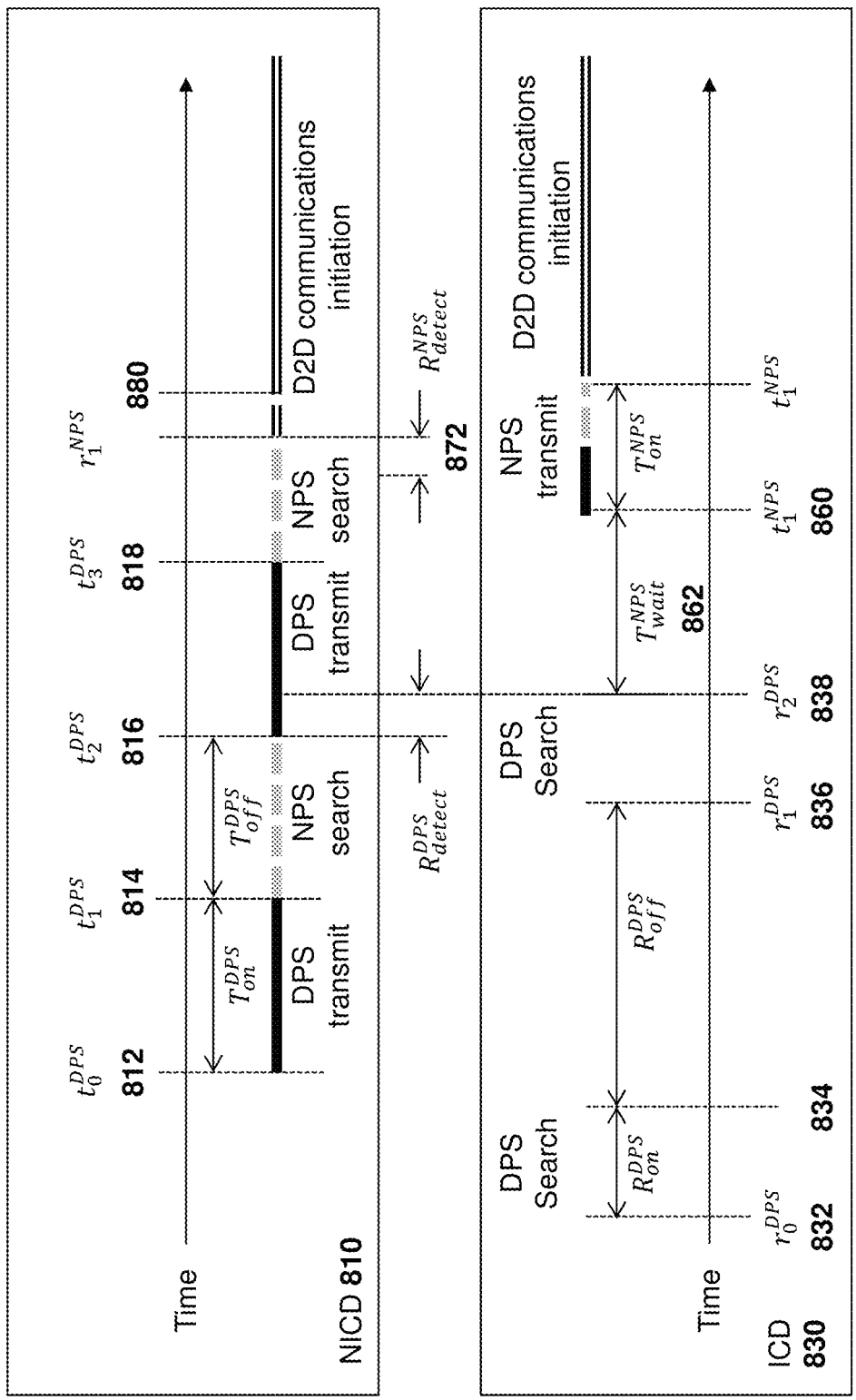
FIG. 8 is a timing diagram showing a discovery signal time sequence.

Reference is now made to FIG. 8, which shows a discovery signal time sequence for both the NICD and the ICD.

As seen in FIG. 8, NICD 810 starts transmitting the DPS at the time 812 and stops transmitting at a time 814. Further, the NICD again begins to transmit at a time 816 and stops transmitting at a time 818. Between times 814 and 816, the NICD 810 does an NPS search. This continues until an NPS is received.

On ICID 830, at time 832, labeled $r_0^{DPS}$, In-Coverage Device 830 begins to search for the Device Presence Signal from a proximate Not-In-Coverage Device. The time point may be configured, along with the radio resources that are used. Such configuration of radio resources may be configured at the device or for the device through signalling, as described above.

As seen in FIG. 8, the DPS search starts at the time point 832 and ends at a time point 834. The DPS search again restarts at a time point 836 and ends at a time point 838.

To ensure the detection of a DPS that may be transmitted within the range of the ICD 830, ICD 830 monitors the radio resources allocated to the DPS transmission for a period of $R_{on}^{DPS} \geq k_1 * R_{detect}^{DPS}$, where $R_{detect}^{DPS}$ is the minimum time required to detect a DPS and $k_1 \geq 2$.

The value of the $R_{detect}^{DPS}$ used for a DPS based on a Zadoff-Chu sequence may be different from the value used for a DPS based on a DSSS sequence as described above.

If the ICD 830 does not detect the DPS transmission during the active search period, a subsequent period of time may exist between time points 834 and 836 where the ICD does not search for the DPS either to conserve battery power or to process downlink transmissions from a base station.

As seen in FIG. 8, the Not-In-Coverage Device begins to transmit a Device Presence Signal (DPS) within the allocated time spectrum and the duration between time 812 and 814 may at least be $T_{on}^{DPS} = k_2 * R_{detect}^{DPS}$ where $R_{detect}^{DPS}$ is the minimum time required to detect a DPS and $k_2 > k_1$. Detection probability is greater when $k_2$ is selected to be much larger than $k_1$.

At time 814, NICD 810 stops transmitting its DPS for a certain period and searches for a Network Presence Signal within that allocated time. The NICD may also search for an Off-Network Presence Signal transmitted by a proximate Not-In-Coverage Device as described above.

As further described above, the NICD may-be-configured for where and when to search for the NPS and NPS-O. In some embodiments, if the NICD is capable of full duplex communication when operating off-network, the transmission of the DPS and the search for the NPS may occur simultaneously.

To ensure detection of an NPS that may be transmitted within range of NICD 810, the NICD 810 may monitor the radio resources allocated to NPS transmission for a period $T_{off}^{DPS} \geq k_3 * R_{detect}^{NPS}$ where $R_{detect}^{NPS}$ is the minimum time required to detect a NPS and $k_3 \geq 2$.

At time 816, the NICD begins to transmit its DPS again if it does not receive an NPS by time 816.

As shown at time 838, ICD 830 begins searching for the DPS and receives the DPS from NICD 810 in the example of FIG. 8.

The ICD then proceeds according to its configuration for responding to the detection of the DPS. This is described above and may include communication with a base station or autonomously responding to the detected DPS.

Further, as described above, a base station may assign resources for subsequent NPS transmissions to the ICD after the detection of the DPS is reported by the ICD. In a further embodiment the ICD responds with a specific resource grant to the NICD after a DPS in the form of a DPS-RAR. The base station may assign resources for subsequent NPS after detection of the DPS is reported by the ICD and also informs the ICD of the uplink grant to be indicated to the NICD.

In some cases where a DPS-RAR is used, the base station may provide the same contents of the DPS-RAR to the ICD for forwarding to the NICD as described above and possibly including one or more of the RNTI for the NICD for further communication, uplink grant for the next transmission or a response transmission configuration.

If a DPS-RAR is used, the ICD may determine and provide the same contents of the DPS-RAR for forwarding to the NICD and may possibly include one or more of a timing advance, power control and indications. The timing advance may be calculated by the ICD from the DPS in relation to uplink or downlink subframe timing. Power control indications may be calculated based on the received power compared to the threshold at the ICD.

The base station may opt to not assign other transmissions on the resources during transmission schedules for the ICD and/or NICD response in order to improve reception.

Where the ICD is configured by the base station to transmit the NPS in a given allocation, the embodiment continues by transmitting the NPS at a time 860. Specifically, after detecting the DPS, the ICD waits for a period 862 to ensure that the proximate NICD has completed its transmission of the DPS and is searching for an NPS. At time 860 the ICD begins transmission of a Network Presence Signal and the ICD may be configured where and when to transmit this NPS. To ensure that the NPS can be detected by a proximate NICD, the ICD 830 may transmit the NPS for a period $T_{on}^{NPS} = k_4 * R_{detect}^{NPS}$ where $R_{detect}^{NPS}$ is a minimum time required to detect a NPS and $k_4 >> k_3$.

In the case of an NPS in the form of DPS-RAR, the transmission may be sent once during the allocation given by the base station.

As indicated above, at time 818 the NICD stops transmitting its DPS and resumes its search for a NPS. In some cases the NICD will use a search window of a fixed time after the DPS transmission in which it will look for NPS results. In other embodiments, the window may be relatively small as, after the DPS has been reported by the ICD to the base station, the base station may schedule the NPS response opportunity within a small window with the expectation that the NICD will be expecting a transmission.

At a time 872 within the NPS search window, the NICD 810 determines that it has detected the transmission of an NPS. At this point, based on the characteristics of the NPS, the NICD now has symbol and frame synchronisation with ICD 830.

Ata time 880, following the transmission of the NPS, the ICD 830 and NICD 810 may initiate procedures enabling D2D communication under partial network coverage.

In a variant of this embodiment, after the transmission of the NPS the ICD may begin broadcast transmissions to the NICD within its range. Within these broadcast transmissions, further indications or control messages of broadcast resources for use by the NICDs may be included.

In the embodiment of FIG. 8, the on/off periods are merely illustrative. In some cases, the DPS transmit time may be only one subframe, while the NPS search time may be several subframes or frames. Additionally, there may be additional time gaps between the transmit and search times when the NICD may be inactive and waiting for the NPS search window.

Figure 9:
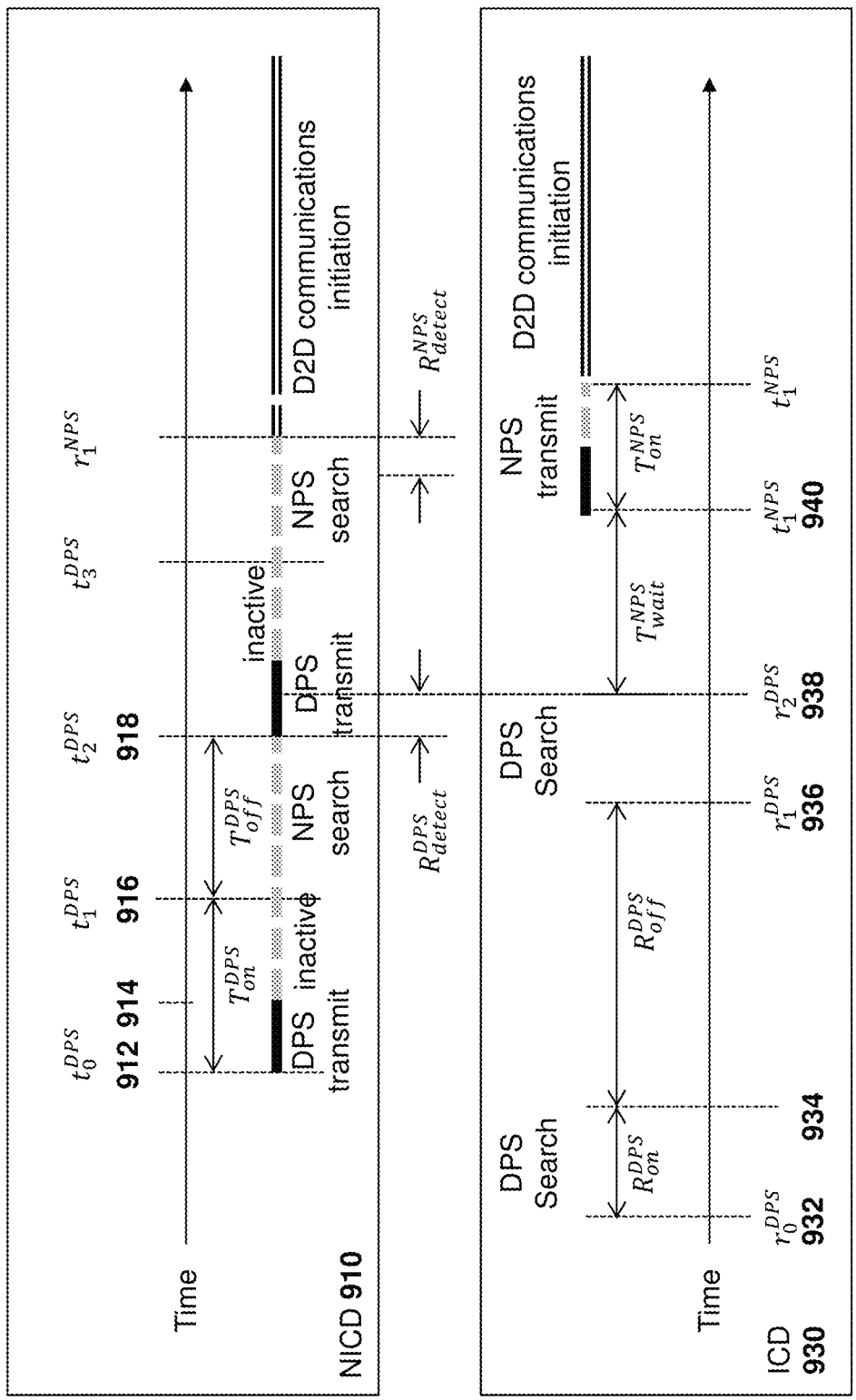
FIG. 9 is a timing diagram showing an alternative discovery signal time sequence.

For example, one alternate configuration for the NICD is shown below with regard to FIG. 9. The DPS is transmitted at the beginning of the window for the DPS and afterwards the NICD is inactive as it does not expect a response from an ICD so quickly after the DPS transmissions. Specifically, FIG. 9 shows an alternate configuration in which NICD 910 sends a DPS transmission at time 912 and has an inactive time that starts at time 914. At time 916, an NPS search begins after which, if no NPS is received the NICD starts the DPS transmit at time 918.

ICD 930 starts a DPS search at time 932 and stops the DPS search at time 934. After this, the ICD 930 listens for other communications or turns off its radio for a time period that ends at a time 936, at which the DPS search can again commence.

As shown in the embodiment of FIG. 9, at time 938 a DPS is detected during a DPS search interval and a wait time is started until time 940. At time 940 the NPS transmission starts.

Thus, the embodiment of FIG. 8 and FIG. 9 differ in that certain waiting periods are built in to both the NICD and the ICD in the embodiment of FIG. 9.

Discovery of an NICD by Another NICD

In a further embodiment, one NICD may be discovered by another NICD where both NICDs are operating in the same frequency band. In this case, a first NICD follows the procedures described above where such an NICD is not aware of whether in-coverage or out of coverage devices are within the range of its DPS transmissions.

The second NICD begins to search for Device Presence Signals from the proximate NICD. Such second NICD may be configured for where and when to search for the DPS.

To ensure the detection of the DPS that may be transmitted within its range, the second NICD may monitor the radio resources allocated to the DPS transmission for a period $R_{on}^{DPS} \geq k_1 * R_{detect}^{DPS}$ where $R_{detect}^{DPS}$ is the minimum time required to detect a DPS and $k_1 \geq 2$.

If the value of $R_{detect}^{DPS}$ used for the DPS is based on a Zadoff-Chu sequence, the value may be different from the value for the DPS based on a DSSS sequence.

If the second NICD does not detect a DPS transmission during the active search period it may attempt to detect transmission of an NPS by a proximate ICD or it may begin its own transmission of the DPS. In this embodiment, the search order is not important and an NICD may search for an NPS before the DPS or search for the DPS before the NPS or search for a DPS only or an NPS only or may search for neither DPS nor NPS before transmitting its own DPS.

If the second NICD does detect a DPS transmission from the first NICD, the second NICD may wait for a time period $T_{wait}^{NPS} = T_{on}^{DPS}$ to ensure that the proximate NICD has completed transmission of its DPS and is searching for an NPS.

At a time $t_1^{NPS}$, similar to the embodiment of FIG. 8, the second NICD begins a transmission of its Off-Network Presence Signal and the configuration of when and where to transmit the NPS-O may be preconfigured.

To ensure that the NPS-O may be detected by a proximate NICD, the second NICD transmits the NPS-O for a time period $T_{on}^{NPS} = k_4 * R_{detect}^{NPS}$ where $R_{detect}^{NPS}$ is a minimum time required to detect a NPS and $k_4 \gg k_3$.

At some point within its search window, the first NICD determines that it has detected the transmission of an NPS-O and at this point, based on the characteristics of the NPS, the NICD now has symbol and frame synchronization with the second NICD. Because the responding signal detected by the first NICD is an Off-Network Presence Signal, the first NICD may initiate procedures to enable off-network D2D communications.

This differs from the procedures above in which the first NICD may have initiated procedures enabling D2D communications under partial network coverage.

Cross-Band Discovery of an NICD by an ICD

In the case where one ICD operates in a first frequency band, referred to herein as Band-A, in some cases the discovery will need to be made of NICDs that are operating in a different frequency band, referred to herein as Band-B. For example, Band-A may be licensed commercial spectrum whereas Band-B may be public safety spectrum band.

In this case, an ICD while operating in Band-A, may-be-configured to search for NICDs operating in Band-B.

RRC signalling from the base station in Band-A serving the ICD may include information elements similar to those used for inter-frequency measurements. For example, such signalling may include a carrier frequency and a measurement gap configuration.

During the configured measurement gap in Band-A, the ICD may switch to Band-B and begin NICD discovery procedures in Band-B. Such procedures may be similar to those described above.

If the ICD detects an NICD transmitting a DPS in Band-B, the ICD may-be-configured to initiate one of the following procedures.

A first procedure may be to report the discovery of the DPS to the serving base station in Band-A when the device returns from the measurement gap.

A second procedure may be to request a handover to Band-B when the ICD returns from the measurement gap.

A third procedure may be to autonomously begin transmitting the NPS or NPS-O in Band-B.

Discovery of an ICD by an NICD

In this embodiment, the discovery of an ICD by an NICD may occur when both are operating in the same frequency band. Thus, at some point in time, a Not-In-Coverage Device may begin to search for the Network Presence Signal from any proximate In-Coverage Device. As indicated above, the NICD may-be-configured with regard to where and when to search for the NPS.

To ensure the detection of an NPS that may be transmitted within the range of the NICD, the NICD monitors radio resources allocated to NPS transmission for a period $R_{on}^{NPS} \geq k_3 * R_{detect}^{NPS}$ where $R_{detect}^{NPS}$ is the minimum time required to detect a NPS and $k_3 \geq 2$.

If the NICD does not detect the NPS transmission during the active search period then it may attempt to detect the transmission of the DPS by a proximate ICD or it may begin its own transmission of the DPS. The order of the search is unimportant and the NICD may search for the NPS before DPS, search for the DPS before the NPS, search for DPS only, search for NPS only, or search for neither DPS nor NPS before transmitting its own DPS.

If the NICD does detect an NPS transmission, then based on the characteristics of the NPS the NICD now has symbol and frame synchronization with the proximate ICD.

Because the signal detected by the NICD is a Network Presence Signal, the NICD may initiate procedures enabling D2D communications under partial network coverage.

Base Stations and Devices

The various base stations described above may be implemented using any network element. A simplified network element is shown with regard to FIG. 10.

Figure 10:
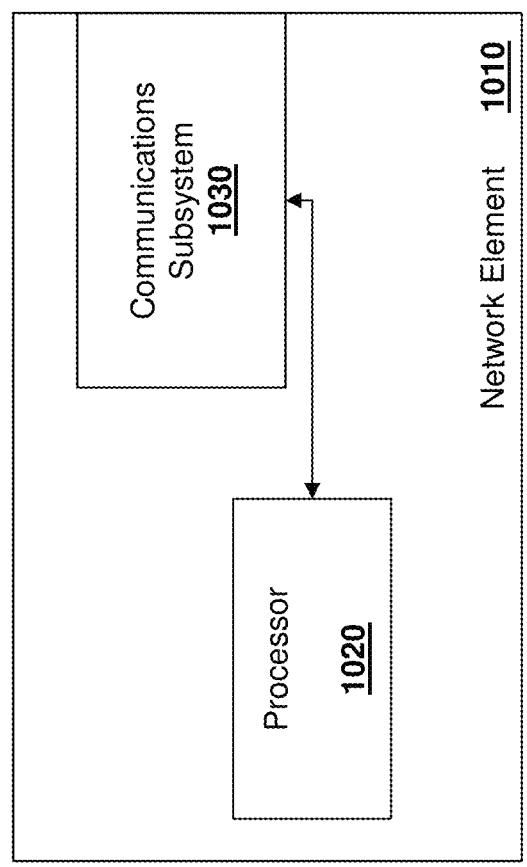
FIG. 10 is a simplified block diagram of an example network element.

In FIG. 10, network element 1010 includes a processor 1020 and a communications subsystem 1030, where the processor 1020 and communications subsystem 1030 cooperate to perform the methods described above.

Further, the above may be implemented by any wireless device. One exemplary device is described below with regard to FIG. 11, and can represent either an NICD or ICD.

Wireless device 1100 is typically a two-way wireless communication device having voice and data communication capabilities. Wireless device 1100 generally has the capability to communicate with other computer systems. Depending on the exact functionality provided, the wireless device may be referred to as a data messaging device, a two-way pager, a wireless e-mail device, a cellular telephone with data messaging capabilities, a wireless Internet appliance, a user equipment, a mobile device, or a data communication device, as examples.

Where wireless device 1100 is enabled for two-way communication, it may incorporate a communication subsystem 1111, including at least one receiver 1112 and transmitter 1114, as well as associated components such as one or more antenna elements 1116 and 1118, local oscillators (LOs) 1113, and a processing module such as a digital signal processor (DSP) 1120. As will be apparent to those skilled in the field of communications, the particular design of the communication subsystem 1111 will be dependent upon the communication network or ad hoc network in which the device is intended to operate. The radio frequency front end of communication subsystem 1111 can be any of the embodiments described above.

For ICDs, network access requirements will also vary depending upon the type of network 1119. In some networks network access is associated with a subscriber or user of wireless device 1100. A wireless device may require a removable user identity module (RUIM) or a subscriber identity module (SIM) card in order to operate on a network. The SIM/RUIM interface 1144 is normally similar to a card-slot into which a SIM/RUIM card can be inserted and ejected. The SIM/RUIM card can have memory and hold many key configurations 1151, and other information 1153 such as identification, and subscriber related information.

Figure 11:
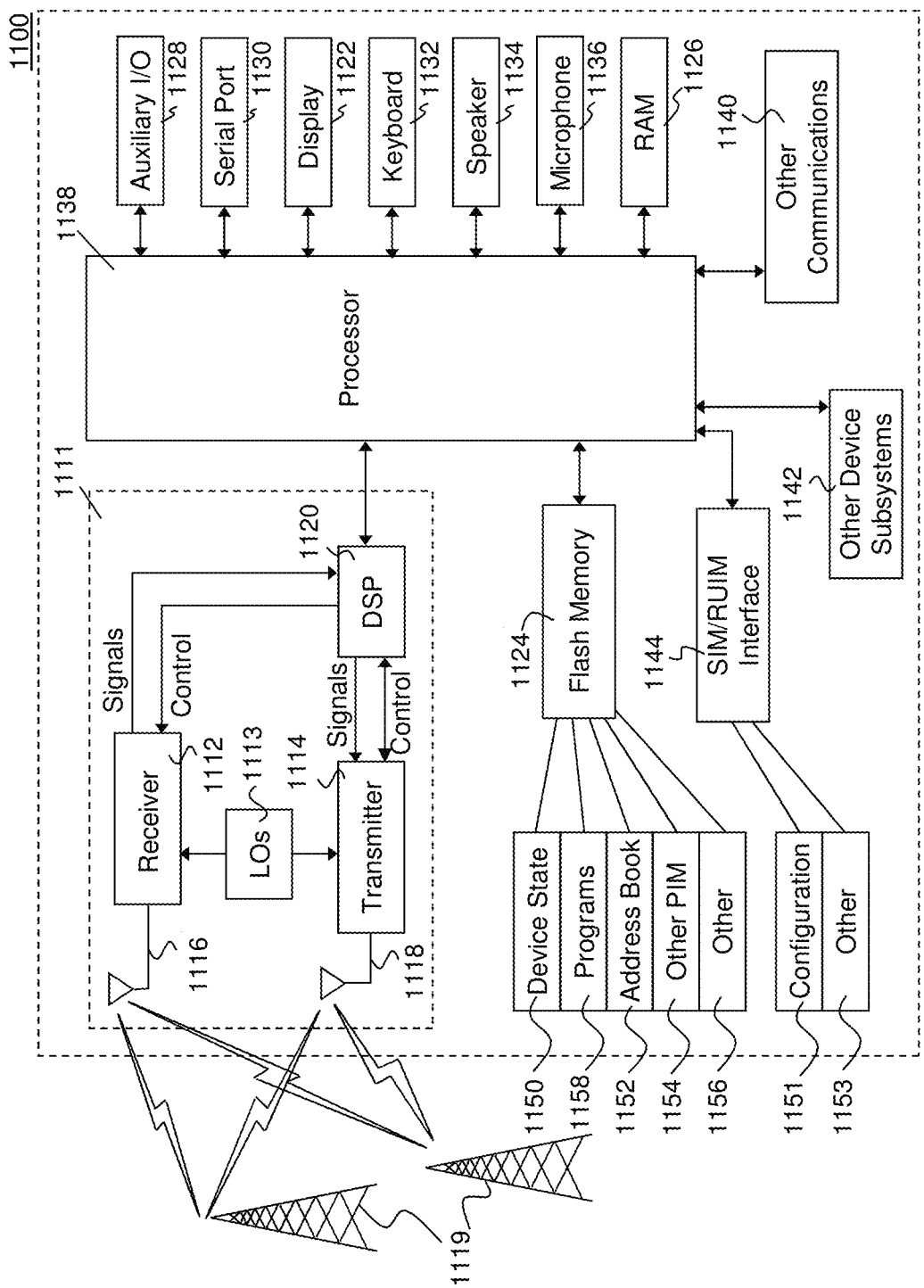
FIG. 11 is a block diagram of an example wireless device for use with the embodiments described herein.

When required network registration or activation procedures have been completed, wireless device 1100 may send and receive communication signals over the network 1119. As illustrated in FIG. 11, network 1119 can consist of multiple base stations communicating with the wireless device. These can include base stations for both fixed and ad hoc networks.

Signals received by antenna 1116 through communication network 1119 are input to receiver 1112, which may perform such common receiver functions as signal amplification, frequency down conversion, filtering, channel selection and the like. A/D conversion of a received signal allows more complex communication functions such as demodulation and decoding to be performed in the DSP 1120. In a similar manner, signals to be transmitted are processed, including modulation and encoding for example, by DSP 1120 and input to transmitter 1114 for digital to analog conversion, frequency up conversion, filtering, amplification and transmission via antenna 1118. DSP 1120 not only processes communication signals, but also provides for receiver and transmitter control. For example, the gains applied to communication signals in receiver 1112 and transmitter 1114 may be adaptively controlled through automatic gain control algorithms implemented in DSP 1120.

Wireless device 1100 generally includes a processor 1138 which controls the overall operation of the device. Communication functions, including data and voice communications, are performed through communication subsystem 1111. Processor 1138 also interacts with further device subsystems such as the display 1122, flash memory 1124, random access memory (RAM) 1126, auxiliary input/output (I/O) subsystems 1128, serial port 1130, one or more keyboards or keypads 1132, speaker 1134, microphone 1136, other communication subsystem 1110 such as a short-range communications subsystem and any other device subsystems generally designated as 1142. Serial port 1130 could include a USB port or other port known to those in the art.

Some of the subsystems shown in FIG. 11 perform communication-related functions, whereas other subsystems may provide "resident" or on-device functions. Notably, some subsystems, such as keyboard 1132 and display 1122, for example, may be used for both communication-related functions, such as entering a text message for transmission over a communication network, and device-resident functions such as a calculator or task list.

Operating system software used by the processor 1138 may be stored in a persistent store such as flash memory 1124, which may instead be a read-only memory (ROM) or similar storage element (not shown). Those skilled in the art will appreciate that the operating system, specific device applications, or parts thereof, may be temporarily loaded into a volatile memory such as RAM 1126. Received communication signals may also be stored in RAM 1126.

As shown, flash memory 1124 can be segregated into different areas for both computer programs 1158 and program data storage 1150, 1152, 1154 and 1156. These different storage types indicate that each program can allocate a portion of flash memory 1124 for their own data storage requirements. Processor 1138, in addition to its operating system functions, may enable execution of software applications on the UE. A predetermined set of applications that control basic operations, including at least data and voice communication applications for example, will normally be installed on wireless device 1100 during manufacturing. Other applications could be installed subsequently or dynamically.

Applications and software may be stored on any computer readable storage medium. The computer readable storage medium may be a tangible or in transitory/non-transitory medium such as optical (e.g., CD, DVD, etc.), magnetic (e.g., tape) or other memory known in the art.

One software application may be a personal information manager (PIM) application having the ability to organize and manage data items relating to the user of the wireless device such as, but not limited to, e-mail, calendar events, voice mails, appointments, and task items. Naturally, one or more memory stores would be available on the wireless device to facilitate storage of PIM data items. Such PIM application may have the ability to send and receive data items, via the wireless network 1119. Further applications may also be loaded onto the UE 1100 through the network 1119, an auxiliary I/O subsystem 1128, serial port 1130, short-range communications subsystem 1140 or any other suitable subsystem 1142, and installed by a user in the RAM 1126 or a non-volatile store (not shown) for execution by the processor 1138. Such flexibility in application installation increases the functionality of the device and may provide enhanced on-device functions, communication-related functions, or both. For example, secure communication applications may enable electronic commerce functions and other such financial transactions to be performed using the wireless device 1100.

In a data communication mode, a received signal such as a text message or web page download will be processed by the communication subsystem 1111 and input to the processor 1138, which may further process the received signal for output to the display 1122, or alternatively to an auxiliary I/O device 1128.

A user of wireless device 1100 may also compose data items such as email messages for example, using the keyboard 1132, which may be a complete alphanumeric keyboard or telephone-type keypad, among others, in conjunction with the display 1122 and possibly an auxiliary I/O device 1128. Such composed items may then be transmitted over a communication network through the communication subsystem 1111.

For voice communications, overall operation of UE 1100 is similar, except that received signals would typically be output to a speaker 1134 and signals for transmission would be generated by a microphone 1136. Alternative voice or audio I/O subsystems, such as a voice message recording subsystem, may also be implemented on wireless device 1100. Although voice or audio signal output is generally accomplished primarily through the speaker 1134, display 1122 may also be used to provide an indication of the identity of a calling party, the duration of a voice call, or other voice call related information for example.

Serial port 1130 in FIG. 11 is an optional device component that may enable a user to set preferences through an external device or software application and would extend the capabilities of wireless device 1100 by providing for information or software downloads to wireless device 1100 other than through a wireless communication network. The alternate download path may for example be used to load an encryption key onto the device through a direct and thus reliable and trusted connection to thereby enable secure device communication. As will be appreciated by those skilled in the art, serial port 1130 can further be used to connect the wireless device to a computer to act as a modem or for charging the device.

Other communications subsystems 1140, such as a short-range communications subsystem, is a further optional component which may provide for communication between wireless device 1100 and different systems or devices, which need not necessarily be similar devices. For example, the subsystem 1140 may include an infrared device and associated circuits and components or a Bluetooth™ communication module to provide for communication with similarly enabled systems and devices. Subsystem 1140 may further include non-cellular communications such as WiFi, WiMAX, or near field communications (NFC).

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

The invention claimed is:

1. A method at an In Coverage wireless Device (ICD), the method comprising:
    listening for a device presence signal (DPS) during a predetermined time period configured by a base station, and if the ICD does not detect the DPS transmission during the predetermined time period, delaying searching for the DPS for a subsequent period of time to conserve battery power and wherein the listening is performed on downlink resources complementary to predetermined uplink resources; and
    transmitting a network presence signal (NPS) in response to the device presence signal wherein the transmitting utilizes the predetermined uplink resources;
    wherein the NPS includes an indication of resources for a Not-in-coverage Device (NICD) to use in response; and
    wherein the NPS comprises one of a first value indicating it was sent outside of base station control or a second value indicating it was sent under base station control.

2. The method of claim 1 wherein the uplink and downlink resources are frequency division duplex resources.

3. The method of claim 1, wherein the device presence signal is one of:
    transmitted without detecting presence of any network or other device; or
    an unmodulated physical signal.

4. The method of claim 1, wherein frequency spectrum for the listening is configured by the base station.

5. The method of claim 1, wherein the transmitting is performed autonomously at the wireless device.

6. The method of claim 1, further comprising informing the base station of the device presence signal and receiving instructions from the base station to transmit the network presence signal.

7. The method of claim 1, wherein the transmitting is one of:
    preconfigured with a predetermined duration for a burst transmission, and a period between burst transmissions; or
    preconfigured for a part of a radio spectrum to use.

8. The method of claim 1, wherein the device presence signal is:
    based on a Zadoff-Chu sequence; or
    spread in frequency using a direct sequence spread spectrum signal.

9. The method of claim 8, wherein the device presence signal is a third generation partnership project Long Term Evolution random access preamble.

10. The method of claim 1, wherein the network presence signal includes an indication of at least one of:
    an identifier for further control and data transmissions;
    timing advance;
    power control instruction; or
    configuration information for information to be sent from the wireless device in a next transmission.

11. The method of claim 10, wherein the information to be sent from the wireless device in the next transmission includes at least one of: a device identifier; a proximity services identifier; or a group identifier.

12. The method of claim 1, wherein the network presence signal provides clocking information for the wireless device.

13. An In Coverage wireless Device (ICD) comprising a processor, wherein the processor is configured to:
    listen for a device presence signal (DPS) during a predetermined time period configured by a base station, and if the ICD does not detect the DPS transmission during the predetermined time period, delaying searching for the DPS for a subsequent period of time to conserve battery power and wherein the listening is performed on downlink resources complementary to predetermined uplink resources; and transmit a network presence signal (NPS) in response to the device presence signal wherein the transmitting utilizes the predetermined uplink resources; wherein the NPS includes an indication of resources for a Not-in-coverage Device (NICD) to use in response; and wherein the NPS comprises one of a first value indicating it was sent outside of base station control or a second value indicating it was sent under base station control.

14. The In Coverage wireless Device of claim 13 wherein the uplink and downlink resources are frequency division duplex resources.

15. The In Coverage wireless Device of claim 13, wherein the device presence signal is one of:

transmitted without detecting presence of any network or other device; or an unmodulated physical signal.

16. The In Coverage wireless Device of claim 13, wherein frequency spectrum for the listening is configured by the base station.

17. The In Coverage wireless Device of claim 13, wherein the In Coverage wireless Device is configured to transmit autonomously.

18. The In Coverage wireless Device of claim 13, wherein the In Coverage wireless Device is further configured to inform the base station of the device presence signal and receive instructions from the base station to transmit the network presence signal.

19. A non-transitory computer readable medium for storing instruction code, which, when executed by a processor of an In Coverage wireless Device (ICD) is configured to cause the ICD to:

listen for a device presence signal (DPS) during a predetermined time period configured by a base station, and if the ICD does not detect the DPS transmission during the predetermined time period, delaying searching for the DPS for a subsequent period of time to conserve battery power and wherein the listening is performed on downlink resources complementary to predetermined uplink resources; and transmit a network presence signal (NPS) in response to the device presence signal wherein the transmitting utilizes the predetermined uplink resources; wherein the NPS includes an indication of resources for a Not-in-coverage Device (NICD) to use in response; and wherein the NPS comprises one of a first value indicating it was sent outside of base station control or a second value indicating it was sent under base station control.

\* \* \* \* \*